United States Patent
Marquant et al.

(10) Patent No.: US 11,125,712 B2
(45) Date of Patent: Sep. 21, 2021

(54) METHOD AND DEVICE FOR DETERMINING A CONCENTRATION OF AT LEAST ONE ANALYTE

(71) Applicant: Roche Diagnostics Operations, Inc., Indianapolis, IN (US)

(72) Inventors: Michael Marquant, Mannheim (DE); Samuel Evgin, Ludwigshafen (DE); Melanie Klein, Neustadt (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 16/441,282

(22) Filed: Jun. 14, 2019

(65) Prior Publication Data

US 2019/0310221 A1    Oct. 10, 2019
US 2020/0292483 A9    Sep. 17, 2020

Related U.S. Application Data

(63) Continuation of application No. PCT/EP2017/083838, filed on Dec. 20, 2017.

(30) Foreign Application Priority Data

Dec. 21, 2016    (EP) .................................... 16205825

(51) Int. Cl.
*G01N 27/327*    (2006.01)

(52) U.S. Cl.
CPC ................ *G01N 27/3274* (2013.01)

(58) Field of Classification Search
None
See application file for complete search history.

(56) References Cited

U.S. PATENT DOCUMENTS

2004/0157338 A1 *    8/2004    Burke ................ G01N 27/3274
                                                        436/147
2007/0264721 A1    11/2007    Buck

FOREIGN PATENT DOCUMENTS

CN    102683151 A    9/2012
CN    102954992 A    3/2013
(Continued)

OTHER PUBLICATIONS

Hoenes, Joachim et al., The Technology Behind Glucose Meters: Test Strips, Diabetes Technology & Therapeutics, 2008, pp. S-10-S-26, vol. 10, Supplement 1.

(Continued)

*Primary Examiner* — J. Christopher Ball
(74) *Attorney, Agent, or Firm* — Roche Diagnostics Operations, Inc.

(57) ABSTRACT

A method for determining a concentration of at least one analyte in bodily fluid, comprising: a signal generation step, wherein an excitation voltage signal is generated by a signal generator, wherein the excitation voltage signal comprises a poly frequent alternating current (AC) voltage and a direct current (DC) voltage profile, wherein the poly frequent AC voltage comprises at least two frequencies; a signal application step, wherein the excitation voltage signal is applied to at least two measurement electrodes; a measurement step, wherein a response is measured by using the measurement electrodes; an evaluation step, wherein an AC current response for each frequency and a DC current response are evaluated from the response; a determination step, wherein the concentration of the analyte is determined from the DC current response and from one or both of the phase and impedance information by using at least one predetermined relationship.

13 Claims, 7 Drawing Sheets

(56) References Cited

FOREIGN PATENT DOCUMENTS

| | | |
|---|---|---|
| EP | 1613955 B1 | 4/2008 |
| WO | 2003/060154 A2 | 7/2003 |
| WO | 2004/113896 A2 | 12/2004 |
| WO | 2010/040482 A1 | 4/2010 |
| WO | 2011/079938 A2 | 7/2011 |
| WO | 2014/0140170 A1 | 9/2014 |
| WO | 2014/140173 A1 | 9/2014 |

OTHER PUBLICATIONS

International Search Report dated Jan. 30, 2018, in Application No. PCT/EP2017/083838, 3 pp.

\* cited by examiner

METHOD AND DEVICE FOR DETERMINING A CONCENTRATION OF AT LEAST ONE ANALYTE

CROSS-REFERENCE TO RELATED APPLICATIONS

This application is a continuation of International Patent Application No. PCT/EP2017/083838, filed 20 Dec. 2017, which claims the benefit of European Patent Application No. 16205825.9, filed 21 Dec. 2016, the disclosures of which are hereby incorporated herein by reference in their entirety.

TECHNICAL FIELD

The present disclosure relates to methods and devices for determining a concentration of at least one analyte. The method and devices according to the present disclosure may be used for detecting at least one analyte present in one or both of a body tissue or a body fluid, in particular the method and devices are applied in the field of detecting one or more analytes such as glucose, lactate, triglycerides, cholesterol or other analytes, typically metabolites, in body fluids such as blood, typically whole blood, plasma, serum, urine, saliva, interstitial fluid or other body fluids, both in the field of professional diagnostics and in the field of home monitoring. However, other fields of application are feasible.

BACKGROUND

In the field of medical technology and diagnostics, a large number of devices and methods for detecting at least one analyte in a body fluid are known. The method and devices may be used for detecting at least one analyte present in one or both of a body tissue or a body fluid, in particular one or more analytes such as glucose, lactate, triglycerides, cholesterol or other analytes, typically metabolites, in body fluids such as blood, typically whole blood, plasma, serum, urine, saliva, interstitial fluid or other body fluids. Further devices are known for measuring activating times, e.g., a thrombin activation time measurement for coagulation monitoring. Without restricting the scope of the present disclosure, in the following, mainly reference is made to the determination of glucose as an exemplary and typical analyte.

The determination of an analyte concentration, e.g., of blood glucose, as well as a corresponding medication is an essential part of the daily routine for many diabetics. In order to increase convenience and in order to avoid restricting the daily routine by more than a tolerable degree, portable devices and test elements are known in the art, such as for measuring blood glucose concentration during work, leisure or other activities away from home. In the meantime, many test devices are commercially available. A large number of test devices and test systems are known which are based on the use of test elements in the form of test strips. Applications are known, in which a multiplicity of test strips is provided by a magazine, wherein a test strip from the magazine automatically may be provided with the testing device. Other applications, however, are known in which single test strips are used, which are inserted into the testing device manually by a user. Therein, typically, the end of the test strip is adapted to be inserted into the testing device and for detecting the analyte, wherein the opposing end of the test strip serves as a handle enabling the user to push the test strip into the testing device or to remove the test strip from the testing device. For applying the sample to the test element, typical test elements provide at least one sample application site, such as a capillary opening in capillary test elements or a sprite net in optical test strips having a top dosing system. Test strips of this type are commercially available, e.g., under the trade name Accu-Chek Active®. Alternatively to home care applications, such test elements may be used in professional diagnostics, such as in hospital applications.

In many cases, for detecting the analyte, test elements are used, such as test strips, which comprise one or more test fields having one or more test chemistries. The test chemistries are adapted to change one or more detectable properties in the presence of the analyte to be detected. Thus, electrochemically detectable properties of the test chemistry and/or optically detectable properties of the test chemistry may be changed due to the influence of the presence of the analyte. For potential test chemistries which may be used within the present disclosure, reference may be made to J. Hones et al.: Diabetes Technology and Therapeutics, Vol. 10, Supplement 1, 2008, S-10 to S-26. However, other types of test chemistries may be used within the present disclosure.

In general, the detection of the at least one analyte can be performed by using an electrochemical biosensor. Electrochemical biosensors, e.g., an electrochemical biosensor for determining the concentration of glucose in a blood sample, use enzymes to provide a specific reaction with the analyte. Glucose gets specifically oxidized by an enzyme co-factor, which is permanently or temporally bound to an enzyme. With a permanently bound co-factor a second redox active substance is required, which, as an electron acceptor, gets reduced by a reaction with the enzyme co-factor. By a diffusion process, the reduced substance is moved to an electrode, where, by applying a suitable redox potential, it gets re-oxidized. The transferred electrons can be measured by the resulting current as a measure for the glucose concentration. Further examples are electrochemical biosensors for measuring activation times, wherein a certain status of a stimulated biological process in the test sample is reached. An example is a coagulation time biosensor test strip, wherein the activation of the protease thrombin is detected when the activated thrombin cuts off a redox tag from an artificial peptide substrate. The reduced redox tag can be detected by applying a suitable voltage between at least two electrodes and monitoring an amperometric response.

In electrochemical biosensors amperometric or voltammetric measurement methods are used. However, multiple side effects, e.g., ambient conditions like the ambient temperature and humidity, can cause significantly wrong concentration results, especially in case the tested sample is whole blood. The temperature, and indirectly the humidity, may change a diffusion velocity in a test zone, resulting in varying overall reaction velocities, diffusion and electrode processes. Furthermore, the measurement result may be influenced by properties of the blood sample, like sample temperature, hematocrit level or, in case of an additional impedance measurement, also from ionic strength of the sample. In addition, blood samples can contain substances which cause complex interferences with the analytical detection reaction, especially when blood samples from critically ill patients in hospitals are used, where concentrations of interfering substances, like intravenously administered drugs, can reach high concentrations. The ionic strength, hematocrit and protein levels of these blood samples can frequently be at extreme levels. Accuracy of the measurement results may also be limited by the manufacturing process tolerances within a production lot of the produced test strips. For example, electrode surface variations and electrode distance variations may occur, caused by varying reagent coating thicknesses. Further, a behavior of the test strips can be changed by aging under storage conditions or the time of exposure before starting the actual measurement. Furthermore, changes of an overall test arrangement and conditions during the detection process such as reagent dissolving, sample evaporation, changes of the active electrode surface and ambient temperature changes may influence the measurement result. In addition, several kinds of gradient effects have to be considered. For example, the sample temperature may change during the detection phase; concentrations of reactive components may change due to slow interference reactions; diffusion layers may be disturbed by movements of the sample due to sample dosing effects; reagent layer homogeneity may change during test time due to dissolving, swelling or dismixing effects; the sample can partially dry off due to evaporation effects or intermediate reaction products may be instable or volatile. Furthermore, in test strip based systems a steady state situation may never be reached.

Commercially available test strip based blood glucose systems use a temperature sensor in the connected meter to correct the effect of varying ambient temperatures. However, the test strips may have different temperatures than the temperature sensor in the meter. In addition, further effects like sample temperature and changing sample temperatures during test time are not considered. Other systems analyze a progression of the amperometric measurement curves during test time or implement a series of direct current (DC) pulses with same or reversed polarity to correct certain interference effects. However, by using DC methods only, not all relevant interference effects can be distinguished, such that sufficient error compensation may not be possible, in particular, because signal level and slopes differ depending on the analyte concentration and other varying properties of the test sample. Other systems use additional electrodes sensitive to certain interference effects and sample properties to compensate interference effects. However, a measurement result has to be calculated from responses of different electrodes, such that accuracy may be limited by a geometrical error summation of individual signal noise. In addition, implementation of multiple electrodes may increase complexity of the test strips and, therefore, production cost and manufacturing robustness.

Interference effects can be estimated independently from the analyte concentration by using a combination of an impedance measurement and an amperometric measurement.

Despite the advantages and progress achieved by the above-mentioned developments, some significant technical challenges remain. The impedance measurement may introduce additional interference effects which may have a significant impact on the impedance measurement but not on the amperometric measurement. For example, the varying ionic strength of a blood sample may cause additional imprecision to the measurement result. Furthermore, in such methods different frequency steps may be applied in a sequential manner and the amperometric measurement is performed afterwards or before the impedance measurement. As a consequence, if the overall test conditions during the stepwise executed test sequence change with time, the amperometric measurement can be over- or undercompensated. For example, if the sample temperature changes during test time, the temperature at the time of the impedance measurement could be different compared to the time when the amperometric measurement is executed. As a result, an additional bias may be caused by temperature gradient effect. Further, for example, if an impedance response is determined only during a short time interval of a total test time, the relevant information at any time during the test time may not be observed. Furthermore, if several interference effects and gradients have to be compensated for, compensation may be insufficient. Not all interfering effects can be compensated by using a sequential impedance measurement and amperometric measurement. For example, if redox active interference substances from parenteral administered drugs reacts with the used redox mediator in the detection reagents, high direct current response biases may occur which may not be observed in the alternating current impedance response.

BRIEF SUMMARY

It is against the above background that the embodiments of the present disclosure provide certain unobvious advantages and advancements over the prior art. In particular, the inventors have recognized a need for improvements in a method and a device for determining at least one analyte in a bodily fluid.

Although the embodiments of the present disclosure are not limited to specific advantages or functionality, it is noted that the present disclosure at least partially avoid the shortcomings of known devices and methods of this kind and which at least partially address the above-mentioned challenges. Specifically, reliability of measurement results of a concentration of at least one analyte in bodily fluid are improved.

In accordance with one embodiment of the present disclosure, a method for determining a concentration of at least one analyte in bodily fluid is provided, the method comprising the following steps: at least one signal generation step, wherein at least one excitation voltage signal is generated by at least one signal generator device, wherein the excitation voltage signal comprises at least one poly frequent alternating current (AC) voltage and at least one direct current (DC) voltage profile, wherein the poly frequent AC voltage comprises at least two frequencies; at least one signal application step, wherein the excitation voltage signal is applied to at least two measurement electrodes, which are in contact with the bodily fluid and which are adapted to determine the analyte electrically or electrochemically; at least one measurement step, wherein a response is measured by using the measurement electrodes; at least one evaluation step, wherein an AC current response for each frequency and a DC current response are evaluated from the response by at least one evaluation device, and wherein for each frequency at least one phase information and at least one impedance information is evaluated from the AC current response by the evaluation device; at least one determination step, wherein the concentration of the analyte is determined from the DC current response and from one or both of the phase information and impedance information by using at least one predetermined relationship, wherein the AC voltage and DC profile are superimposed to form the excitation voltage signal.

In accordance with another embodiment of the present disclosure, an analytical device for determining a concentration of at least one analyte in bodily fluid is provided, the analytical device comprising: at least one signal generator device adapted to generate at least one excitation voltage signal, wherein the excitation voltage signal comprises at least one poly frequent alternating current (AC) voltage and at least one direct current (DC) voltage profile, wherein the poly frequent AC voltage comprises at least two frequencies;

at least one measurement unit, wherein the measurement unit is adapted to receive a response, at least one evaluation device adapted to evaluate an AC current response for each frequency and a DC current response from the response, wherein the evaluation device is adapted to evaluate for each frequency at least one phase information and at least one impedance information is evaluated from the AC current response, wherein the evaluation device is adapted to determine a concentration of the analyte from the DC current response and from one or both of the phase information and impedance information by using at least one predetermined relationship, wherein the AC voltage and DC profile are superimposed to form the excitation voltage signal.

Embodiments of the disclosed method and device for determining a concentration of at least one analyte in bodily fluid have the features of the independent claims. Typical embodiments, which might be realized in an isolated fashion or in any arbitrary combination, are listed in the dependent claims.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
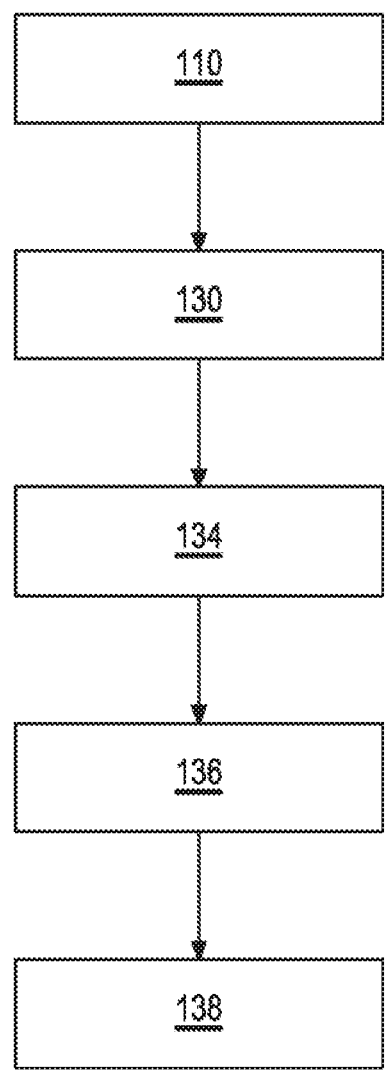
FIG. 1 shows an embodiment of a method according to the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include", or any arbitrary grammatical variations thereof, are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may refer both to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once, typically will be used only once, when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically", "typically", "more typically", or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features without any restriction regarding alternative embodiments of the disclosure, without any restrictions regarding the scope of the disclosure and without any restriction regarding the possibility of combining the features introduced in such a way with other optional or non-optional features of the disclosure.

In a first aspect of the present disclosure, a method for determining a concentration of at least one analyte in bodily fluid is provided. The method comprises the method steps as given in the independent claims and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprising the following steps:

at least one signal generation step, wherein at least one excitation voltage signal is generated by at least one signal generator device, wherein the excitation voltage signal comprises at least one poly frequent alternating current (AC) voltage and at least one direct current (DC) voltage profile, wherein the poly frequent AC voltage comprises at least two frequencies;

at least one signal application step, wherein the excitation voltage signal is applied to at least two measurement electrodes;

at least one measurement step, wherein a response is measured by using the measurement electrodes;

at least one evaluation step, wherein an AC current response for each frequency and a DC current response are evaluated from the response by at least one evaluation device, and wherein for each frequency at least one phase information and at least one impedance information is evaluated from the AC current response by the evaluation device;

at least one determination step, wherein the concentration of the analyte is determined from the DC current response and from one or both of the phase information and impedance information by using at least one predetermined relationship.

As used herein, the term "bodily fluid" generally refers to a fluid which typically is present in a body or body tissue of a user or the patient and/or which may be produced by the body of the user or the patient. In particular, the bodily fluid may be a sample of bodily fluid. As an example for body tissue, interstitial tissue may be named. Thus, as an example, the body fluid may be selected from the group consisting of blood and interstitial fluid. For example, the bodily fluid may be whole blood. However, additionally or alternatively, one or more other types of body fluids may be used, such as saliva, tear fluid, urine or other body fluids. Generally, an arbitrary type of body fluid may be used.

In particular, the concentration of at least one analyte may be determined in a sample of bodily fluid. As used herein, the term "sample" may refer to an arbitrary material or combination of materials taken for an analysis, testing or investigation. The sample may be a limited quantity of something which is intended to be similar to and represent a larger amount. However, the sample may also comprise a full specimen. The sample may be a solid sample, a liquid sample or a gaseous sample or a combination of these. Specifically, the sample may be a fluid sample, i.e., a sample which fully or partially is in a liquid state and/or in a gaseous state. A quantity of the sample may be describable in terms of its volume, mass or size. However, other dimensions are feasible. The sample may comprise only one material or only one compound. Alternatively, the sample may comprise several materials or compounds.

As further used herein, the term "analyte" may refer to an arbitrary element, component or compound which may be present in a body fluid and the concentration of which may be of interest for a user or a patient. Typically, the analyte may be or may comprise an arbitrary chemical substance or chemical compound which may be part of the metabolism of the patient, such as at least one metabolite. As an example, the at least one analyte may be selected from the group consisting of glucose, cholesterol, triglycerides and lactate. Additionally or alternatively, however, other types of analytes may be used and/or any combination of analytes may be determined.

As generally used within the present disclosure, the terms "user" and "patient" may refer to a human being or an animal, independent of the fact that the human being or animal, respectively, may be in a healthy condition or may suffer from one or more diseases. As an example, the patient may be a human being or an animal suffering from diabetes. However, additionally or alternatively, the disclosure may be applied to other types of users or patients.

The term "determining a concentration of at least one analyte in bodily fluid" generally refers to a quantitative detection of the at least one analyte. As a result of the determination, at least one signal, such as at least one measurement signal, and/or at least one measurement value may be produced and/or provided which characterizes an outcome of the determination. The signal specifically may be or may comprise at least one electronic signal such as at least one voltage and/or at least one current. The at least one signal may be or may comprise at least one analogue signal and/or may be or may comprise at least one digital signal.

As used herein, the term "at least one excitation voltage signal" generally refers to at least one arbitrary voltage signal applicable to the bodily fluid, e.g., by using at least two electrodes. The excitation voltage signal may be applied during at least one test sequence, for example a time sequence. The excitation voltage signal comprises at least one poly frequent AC voltage and at least one DC voltage profile.

As used herein, the term "AC voltage", also denoted as AC excitation, refers to an alternating voltage having a periodic signal waveform, for example a sine or triangle waveform. As used herein, the term "poly frequent", generally refers to at least one AC voltage comprising at least a first frequency and at least one second frequency, wherein the first and second frequencies differ. The poly frequent AC voltage comprises at least two frequencies. The AC voltage may have a sine or triangle waveform. Other wave forms are feasible. For example, the AC voltage may comprise at least two AC sine waves having different frequencies. The AC voltage may comprise at least two AC sine waves having different frequencies, wherein the two AC signals are superimposed. The poly frequent AC voltage may comprise three, four or more frequencies. The frequencies may be in the range of 500 Hz to 20 kHz. The poly frequent AC voltage may comprise four superimposed frequencies, for example, 1 kHz, 2 kHz, 10 kHz and 20 kHz.

The AC voltage may have a magnitude or amplitude such that no faradic current response is generated. For example, the magnitude of the AC voltage may be less than 30 mV rms (root mean square).

As used herein, the term "DC voltage profile" generally refers to an arbitrary DC voltage having a time profile. As used herein, the term "DC voltage" refers to a direct voltage having successive phases and/or ramp sections of essential constant voltage. Time span of such phases or ramp sections may be more than $\frac{1}{10}$ seconds. As used herein, "essential constant" generally refers to DC voltage profile having ramps with a rate of increase up to 1 V/s. The DC voltage profile may comprise a time profile. As used herein, the term "time profile" refers to change of DC voltage during one or more of a measurement cycle or test cycle, a measurement interval or test interval, a measurement sequence or test sequence, a whole or total measurement or test time. The DC voltage may be changed and/or may be varied continuously or stepwise. For example, the DC voltage may comprise at least one step sequence. For example, the DC voltage profile may comprise at least two voltage steps. For example, the DC voltage profile may comprise three, four or five voltage steps. Even more voltage steps are feasible. The steps of the DC voltage profile may be selected to allow for a differentiation between an analytical reaction and various interference reactions. The DC voltage may have a rectangular waveform. Other waveforms are feasible.

The DC voltage profile may be selected from the group consisting of: a voltammetric voltage profile; an amperometric voltage profile.

As DC voltage profiles all kinds of voltammetric profiles of voltammetric methods, for example cyclic voltammetry or differential pulse voltammetry, may be used. For example, in cyclic voltammetry the DC voltage, e.g., applied between a working electrode and a counter or reference electrode, may be ramped linearly versus time. In one embodiment of cyclic voltammetry, the DC voltage profile may comprise increasing, e.g., in steps, the DC voltage from a start value to a first turning point, subsequent decreasing from the first turning point to a second turning point and subsequent increasing from the second turning point to the start value. Using voltammetric methods like cyclic voltammetry or differential pulse voltammetry allows obtaining information that can be used to at least partially compensate interference effects of redox active substances, which reacts with an electro mediator or measuring electrodes. By using voltammetry, interference substances will get reduced or oxidized at different potentials compared to the redox mediator used to indicate the analytical detection. Voltammetric methods may allow obtaining information that can be used to identify and compensate for interfering effect. Specifically, voltammetric methods like cyclic voltammetry and differential pulse voltammetry may allow compensating for an influence of substances in blood, which reduce in competition to a substrate- or enzyme-system the redox mediator and may cause a positive biased test result. For example, the voltage profile may comprise at least one sequence configured to differentiate such interferences, for example a DC-measurement having a different polarity. The simultaneous impedance measurement during this sequence can be used to compensate for influences due to temperature of the sample and/or viscosity of a wetted reagent layer.

The DC voltage profile may be or may comprise an amperometric voltage profile. The amperometric voltage profile may comprise different voltage steps, for example a series of amperometric steps at different voltages. The DC voltage profile may be or may comprise at least one amperometric DC voltage step sequence comprising at least two different voltage steps. For example, the DC voltage profile may comprise three voltage steps, wherein in a first voltage step the DC voltage amounts to 500 mV, in a second voltage step the DC voltage amounts to 200 mV and in a third voltage step the DC voltage amounts to −400 mV. However, other voltage steps are feasible. Using information from a time profile of an amperometric response allows for compensation of one or more of unwanted side reaction of the redox mediator with an interfering substance and/or of different reaction velocity compared to an actual detection reaction and/or of substances in a sample directly interfering with electrodes. Furthermore, using a time profile of an amperometric response allows compensating aging effects from storage times or exposure times between opening a primary test element packaging and an actual measurement. Aging effects may occur due to losses of activity of enzymes as specific agent in the detection reagent. Another aging or exposure time effect may be a mediator degradation, which can cause increasing blank currents or signal loss. By using amperometric response time profiles, aging effects and/or influences of aging effects can be determined. By using amperometric response time profiles most of biases caused by redox active interfering substances, enzyme activity loss or redox mediator degradation and ambient temperature effects may be compensated. In particular, compensation of effects of interfering substances and/or temperature effects using amperometric response time progression may be possible in case reaction velocities of competing reaction differ significantly and if the impedance measurement is performed simultaneously, i.e., not only after completion of the reaction but during development of reaction, in particular during preceding chemical reactions.

As further used herein, the term "signal generator device" generally refers to a device, for example a voltage source, being configured to generate a voltage signal. The signal generator device may comprise at least one AC-voltage source and at least one DC-voltage source. The signal generator device may be adapted to generate at least one poly frequent AC voltage. For example, the signal generator may be adapted to generate multiple AC voltage signals each having different frequencies and to sum up the multiple AC signals. The signal generator device may be adapted to generate at least one DC profile.

The AC voltage and DC profile may be superimposed to form the excitation voltage signal. The signal generator device may be adapted to apply the AC voltage and DC profile simultaneously to the bodily fluid. The signal generator device may be adapted to apply the excitation voltage signal comprising superimposed poly frequent AC voltage and DC profile to the bodily fluid. The poly frequent AC voltage and DC profile may be applied to the measurement electrodes without offset time and/or time delay.

The signal generator device may be part of measurement electronics and/or may be connected to the measurement electronics. The signal generator may be part of a measurement electronics, such as of an evaluation device, or may be designed as a separate device.

The excitation voltage signal is applied to at least two measurement electrodes in at least one signal application step. As used herein, the term "measurement electrodes" generally refers to electrodes, e.g., of at least one test element, which are in contact with the bodily fluid and which are adapted to determine the analyte electrically or electrochemically. The method may comprise a sample application step, wherein the sample of a bodily fluid is brought in contact with the measurement electrodes. For example, in the sample application step a test element having a sample application opening and a capillary channel may be used. Thus, the sample of bodily fluid may be applied to the sample application opening and may be transported by the capillary channel to the measurement electrodes. Alternatively, in the sample application step the sample may be brought directly in contact with the electrodes, for example using a test element having face-to-face-electrodes.

As used herein, the term "electrode" may generally refer to an arbitrary element which is configured to or which is usable to electrically or electrochemically detect the analyte. The at least two measurement electrodes may be embodied such that an electrochemical reaction may take place at one or more of the electrodes, such as one or more working electrodes. Thus, the electrodes may be embodied such that an oxidation reaction and/or reduction reaction may take place at one or more of the electrodes. The electrochemical detection reaction may be detected by comparing one or more electrode potentials, such as an electrostatic potential of a working electrode with an electrostatic potential of one or more further electrodes, such as a counter electrode or a reference electrode. Generally, the two or more measurement electrodes may be used for one or more of an amperometric measurement and/or a voltammetric measurement.

The at least two electrodes may comprise at least one working electrode. As used herein, the term "working electrode" refers to an electrode being adapted for or being usable for performing at least one electrochemical detection reaction for detecting the at least one analyte in the body fluid. The working electrode may have or may be brought in contact with at least one test chemical being sensitive to the analyte to be detected. The at least one test chemical may form at least one test chemical surface which may be in contact with the at least one body fluid. The at least two electrodes may further comprise at least one counter electrode. As used herein, the term "counter electrode" refers to an electrode adapted for performing at least one electrochemical counter reaction and adapted for balancing a current flow required by the detection reaction at the working electrode. Additionally or alternatively, the at least two electrodes may further comprise at least one reference electrode. The reference electrode may have a stable and well-known electrode potential. The electrode potential of the reference electrode may typically be highly stable. The counter electrode and the reference electrode may be one of a common electrode or two separate electrodes.

In the at least one measurement step, a response is measured by using the measurement electrodes. The response may be measured at different measurement time points. The response may be measured continuously or at selectable and/or adjustable measurement time points. The response over time may be measured by using selectable and/or adjustable time units. For example, the response may be measured every tenth of a second or even more often. As used herein, the term "response" generally refers to a response signal generated by the at least two measurement electrodes in response to the applied excitation voltage signal. The response may be a current response. The response may comprise multiple signals. The response may comprise an AC and DC response. As used herein, the term "measurement" generally refers to a quantitative and/or qualitative determination of the response, e.g., the current signal. As used herein, "measurement time point" generally refers to an arbitrary point in time and/or arbitrary period of time, in particular a time interval, during the determination of the concentration of the analyte, i.e., during one or more of a measurement cycle or test cycle, a measurement interval or test interval, a measurement sequence or test sequence, a whole or total measurement or test time, at which a response is determined. The measurement time points may be at different time points during test sequence, for example at different excitation voltages of the DC profile.

The method comprises at least one evaluation step, wherein an AC current response for each frequency and a DC current response are evaluated from the response by at least one evaluation device, and wherein for each frequency at least one phase information and at least one impedance information is evaluated from the AC current response by the evaluation device.

As used herein, the term "evaluation device" generally refers to an arbitrary device being configured to derive at least one item of information from data. The evaluation device may be configured to derive the at least one item of information regarding the presence and/or concentration of the analyte in the body fluid or a parameter of the body fluid from at least one signal. The evaluation device may be configured to evaluate the response. As an example, the evaluation device may be or may comprise one or more integrated circuits, such as one or more application-specific integrated circuits (ASICs), and/or one or more data processing devices, such as one or more computers, typically one or more microcomputers and/or microcontrollers. Additional components may be comprised, such as one or more preprocessing devices and/or data acquisition devices, such as one or more devices for receiving and/or preprocessing of the electrode signals, such as one or more converters and/or one or more filters. Further, the evaluation device may comprise one or more data storage devices. Further, as outlined above, the evaluation device may comprise one or more interfaces, such as one or more wireless interfaces and/or one or more wire-bound interfaces. The evaluation device may comprise a blood glucose meter, for example a test strip based meter, an insulin pump, a microprocessor, a cellular phone, a smart phone, a personal digital assistant, a personal computer, or a computer server.

The evaluation device may be adapted to split up and/or to separate the response into the phase information and impedance, i.e., imaginary and real components, information for each frequency of the AC current response and the corresponding DC current response. The method may comprise evaluating for each frequency at least one real and imaginary part of admittance from the AC current response by the evaluation device. In particular, the evaluation device may be adapted to evaluate for each frequency at least one real and imaginary part of admittance from the AC current response. The term "impedance" or "impedance information" refers to complex impedance and/or admittance information. Generally, the complex impedance Z refers to opposition of a circuit to a current in case of applying an excitation voltage and can be described as $Z=R+iX$, wherein real part R is the ohmic resistance and imaginary part X is the reactance. In case of applying a DC excitation voltage only, the impedance comprises only real parts, whereas in case of applying superimposed AC excitation voltage additionally comprises imaginary parts. In polar form the complex impedance can be described by phase angle and magnitude. Thus, the term "phase information" generally refers to information on the phase angle. The admittance is the inverse of the impedance. The admittance Y and impedance Z can be converted into each other $Y=Z^{-1}=1/R+iX=(1/R^2+X^2)(R-iX)$. Admittance is a complex number and can be described in polar form by phase angle and magnitude. As used herein, the terms "AC current response" and "DC current response" generally refer to AC and DC portions or parts of the response. The AC current response and the DC current response may be separated with respect to frequency range. The evaluation device may be adapted to classify a portion of the current response as AC or as DC with respect to a predetermined frequency range. The evaluation device may comprise at least one electronic filter, e.g., a two-way analog electronic filter, adapted to separate the response into AC current response and the corresponding DC current response between about 100 Hz and 500 Hz. The evaluation device may be adapted to separate the response into slow DC current response and the fast changing AC current response. For example, the evaluation device may comprise at least one transimpedance amplifier adapted to amplify response signals dependent on frequency. Subsequently, response signals may be separated by a crossover. AC current response over 500 Hz, in particular in a frequency range from 500 to 20 kHz, may be evaluated periodically and DC current response having a rate of increase below 1 V/s is evaluated as time progression. Below 100 Hz the response may be classified as DC current response and above 500 Hz the response may be classified as AC current response. In the evaluation step the AC current response and the DC current response may be separated using at least one two-way analog electronic filter, which splits the signals between about 100 Hz and 500 Hz, wherein below 100 Hz the response is analyzed as DC and above 500 Hz it is analyzed as AC. The evaluation device may comprise at least one frequency analyzer. Thus, the DC current response and the AC current response may be determined simultaneously, in particular as one response. Thus, the DC current response and the AC current response may be determined and/or measured without offset time and/or time delay.

The method comprises at least one determination step, wherein the concentration of the analyte is determined from the DC current response and from one or both of the phase information and impedance information by using at least one predetermined relationship. The concentration of the analyte may be determined by the evaluation device, e.g., by at least one computing device of the evaluation device.

In the determination step the concentration of the analyte may be determined in consideration of interference effects and production tolerances. The interference effects may be selected from the group consisting of ambient conditions, in particular temperature and humidity; sample properties, in particular sample temperature, hematocrit level, protein level, ionic strength. By applying the excitation voltage signal composed AC voltage having different frequencies and the DC voltage profile it may be possible to get the best possible performance, e.g., from a test strip based analyte concentration or sample property measurement in a whole blood sample, by considering all relevant interference effects and strip production tolerances. The phase information and/or at least one impedance information of each frequency of the AC current response in combination with the DC current response may allow obtaining differentiable information of all those effects. For example, information from more than one frequency may allow differentiating between different interference effects like temperature and hematocrit. Limitations from all kind of gradient effects due to changes of the test conditions during the ongoing test time, especially when information from applied DC voltage profiles or amperometric time progression information are included, may be avoided by obtaining information from the impedance measurement simultaneously with each DC time point of the voltage profile or time trace, which later is included in the concentration calculation.

Known methods comprising usage of DC profiles like voltammetric methods and/or profiles of an amperometric response do not consider and determine information from impedance measurements. However, the limitation of these known methods may be that during required measurement time properties of a test element electrochemical cells are not constant, because all kinds of gradient effects, such as sample temperature, sample-reagent viscosity and/or ongoing capillary filling, may occur. Furthermore, the measured time profiles or voltage profiles may depend on certain properties of the tested sample, especially if it is a blood sample. These properties may be, for example, the hematocrit content, which has a significant impact on the diffusion of the active ingredients in detection reagent mixed with the sample. Other properties may have an impact on the electro conductivity of a blood sample, which depends on the protein content, the lipids content or the ionic strength, e.g., blood sample from critically ill patients. Furthermore, such methods cannot estimate effects of varying ambient and sample temperatures, process tolerances with impact on the electrochemical cell geometry, reagent layer thickness and sample dosing effects. These effects can be estimated by performing an AC impedance measurement between the measuring electrodes, when multiple frequencies are applied and the response per frequency is analyzed. Applying a poly frequent AC voltage and DC profile and determining impedance information from each frequency of the AC current response simultaneously with the DC current response may allow obtaining all required information to correct the DC measurement at the same time point and, thus, take regard of the gradient effects during the overall test time. The method may allow obtaining measurement signals, which comprise differentiable information of the relevant effects. The method according to the present disclosure may allow the achievement of the best possible performance, for example accuracy of a test element, e.g., a test strip, based analyte concentration or sample property measurement in whole blood, by allowing consideration of all relevant interference effects and strip production tolerances.

As used herein, the term "determination of the concentration of the analyte" generally refers to quantitative and/or qualitative determination of the concentration of the analyte. As used herein, the term "predetermined relationship" refers to a known or determinable relationship between the concentration of the analyte and the DC current response, the phase information and impedance information. The relationship can be determined or determinable empirically, analytically or else semi-empirically. The relationship may comprise at least one calibration curve, at least one set of calibration curves, at least one function or a combination of the possibilities mentioned. One or a plurality of calibration curves can be stored, for example in the form of a set of values and the associated function values thereof, for example in a data storage device and/or a table. Alternatively or additionally, however, the at least one calibration curve can also be stored, for example in parameterized form and/or as a functional equation. Various possibilities are conceivable and can also be combined. The predetermined relationship may be provided in the form of at least one look-up table and/or in the form of at least one mathematical formula. The predetermined relationship may be deposited and/or stored, for example in a storage of the evaluation device. The method may comprise determining a predetermined relationship of the concentration of the analyte and the DC current response, the phase information and impedance information.

The evaluation device may be adapted to determine the predetermined relationship. The evaluation device may be adapted to provide mathematical functions and weighting coefficients which, for example, may be stored in a data storage and/or look-up table of the evaluation device. The method may comprise at least one training step, wherein the predetermined relationship is determined. The predetermined relationship, in particular weighting coefficients of the predetermined relationship, may be one or more of selected, determined and verified by mathematical methods selected from the group consisting of multivariate analysis, multilinear principal component analysis, neuronal nets, moving mesh, lasso method, boosted random forest and bootstrapping, on at least one training data set. The training data set may be collected by performing co-variance studies. The training data set may comprise a suitable number of repeated measurements, for example with homogenous produced test elements and/or by applying a selected test sequence with connected electronic circuitry of a measurement device, for example a meter. To obtain the training data set the analyte concentration of each test sample may be determined with a reference method, for example hexokinase method in case of a glucose concentration. To obtain the training data set each combination of relevant combined interference effects may be tested across a relevant concentration range of the analyte with a sufficient amount of repetition for each test combination and test sample. For example, in the case of determining a glucose concentration in a blood sample the major interference effects may be ambient temperatures, hematocrit level, ionic strength, plasma concentrations, lipid concentration or administered interfering substances, especially antioxidants. In case of test elements with unstructured face to face electrodes, which may not comprise separate fill sufficient detection electrodes, a fill level of a capillary may be tested for the training data set generation. Another interference effect might be the storage time in a primary test element package or an impact of environmental condition and exposer time of a test element, e.g., a test strip, when the test element is taken out of the package before executing the measurement. If the test element is not sufficiently robust versus these impacts, also these factors may be considered when obtaining the training data set.

In one embodiment, the predetermined relationship may be $$bG = \Sigma_{i=1}^{n} a_i DC_i e^{\Sigma_{m=1}^{f} b_{m_i} Y_{m_i} + c_{m_i} P_{m_i}},$$

wherein bG is the determined concentration of the analyte, i denotes the number of time points, wherein i, n, f and m are natural integer numbers, m denotes the number of frequencies, $a_i$, $b_i$, $c_i$ are weighting coefficients, $Y_{mi}$ are admittance values from AC response at different frequencies at time points, $P_{mi}$ are phase angle values from AC response at different frequencies at time points and $DC_i$ are DC response values at selected DC response time points. This predetermined relationship may be used for test elements having coplanar electrodes, wherein the electrodes are arranged next to each other in the measurement cell. The weighting coefficients $a_i$, $b_i$, $c_i$ may be deposited and/or stored, for example in a storage of the evaluation device. The weighting coefficients $a_i$, $b_i$, $c_i$ may be one or more of selected, determined and verified by mathematical methods selected from the group consisting of multivariate analysis, multilinear principal component analysis, neuronal nets, moving mesh, lasso method, boosted random forest and bootstrapping, on at least one training data set.

In one embodiment, the predetermined relationship may be $$bG = \sum_{i=1}^{n} \sum_{m=1}^{f} \left( \frac{a_{mi} DC_i}{Y_{(imag)mi}} + \frac{b_{mi} DC_i}{Y_{(real)mi}} \right),$$

wherein bG is the determined concentration of the analyte, i denotes the number of measurement time points, wherein i, n, f and m are natural integer numbers, m denotes the number of frequencies, $a_i$ and $b_i$ are weighting coefficients, $Y_{(imag)mi}$ and $Y_{(real)mi}$ are real and imaginary parts of admittance values from AC response at different frequencies at time points and $DC_i$ are DC response values at selected DC response time points. This predetermined relationship may be used for test elements having face to face electrodes. This predetermined relationship may be in particular advantageous for test elements having face to face electrodes, wherein electrodes are arranged at opposing faces of the measurement cell, because it allows good correlation of all relevant effects between DC and AC signals. In particular, the predetermined relationship may be, $$bG = \sum_{\substack{i,j=1 \\ i \neq j}}^{n} \left( \frac{a_i DC_i}{Y_i} + b_i \left( \frac{DC_i}{Y_i} \cdot \frac{DC_j}{Y_j} \right) \right),$$

wherein bG is the determined concentration of the analyte, i and j denote the number of measurement time points, wherein i, j and n are natural integer numbers, $a_i$, $b_i$ and $c_i$ are weighting coefficients, $Y_i$, and $Y_j$ are either real or imaginary parts of admittance values from AC response at different frequencies at time points i and j. $DC_i$, $DC_j$ are DC response values at selected DC response time points.

In one embodiment, the predetermined relationship may be $$bG = \sum_{\substack{i,j=1 \\ i \neq j}}^{n} \sum_{\substack{m,l=1 \\ m \neq l}}^{f} \left( \frac{a_{mi} DC_i}{Y_{(imag)mi}} + \frac{b_{mi} DC_i}{Y_{(real)mi}} + c_i \left( \frac{DC_i}{Y_{(imag)mj}} \cdot \frac{DC_j}{Y_{(real)li}} \right) + d_i \left( \frac{DC_i}{Y_{(imag)lj}} \cdot \frac{DC_j}{Y_{(real)mi}} \right) \right),$$

wherein bG is the determined concentration of the analyte, i and j denote the number of measurement time points, wherein i, j, n, f, m and l are natural integer numbers, m and l denote the number of frequencies, $a_i$, $b_i$ and $c_i$, $d_i$ are weighting coefficients, $Y_{(imag)mi}$, $Y_{(real)mi}$ $Y_{(imag)mj}$ and $Y_{(real)mj}$ are real and imaginary parts of admittance values from AC response at different frequencies at time points i and j and $DC_i$, $DC_j$ are DC response values at selected DC response time points. This predetermined relationship may be used for test elements having face to face electrodes.

The weighting coefficients may be determined by a moving mesh method. Alternatively neuronal net or multivariate regression methods or combinations of these methods may be used. Other mathematical methods, e.g., the lasso method, may be used, to identify and select relevant observables to reduce a total number in order to reduce complexity and improve portability of the found model from the used training data on independent collected verification data sets.

As outlined above, the excitation voltage signal may be applied during at least one test sequence. As used herein, the term "test sequence" generally refers to an arbitrary period of time during which the excitation voltage signal is applied. The AC and DC current response may be determined at measurement time points continuously and/or non-continuously during the at least one test sequence.

The method further may comprise at least one selection step, wherein in the selection step from the measurement time points at least one DC time point is selected. From the measurement time points DC time points may be selected which are used for determination of the analytical result. In the selection step from the measurement time points a number of DC time point may be selected. For example, three, four, five, six, ten or even twelve DC time points may be selected during at least one test sequence and/or during at least one voltage step of the excitation voltage signal during the test sequence. Even a higher number of DC time points may be feasible. Additionally or alternatively, a replacement of individual DC time points by coefficients derived from a time-regression may be feasible. The DC time point may be a time point at which the DC response current is used in the determination step.

The measurement of AC response may be performed at different measurement time points. In particular admittance values and phase angle values may be determined for different measurement time points. The AC response may be measured during at least one measurement time interval of the whole test sequence. In the measurement time interval the AC response may be integrated for calculation of the analytical result. For example, in the measurement time interval at least one measurement vector may be integrated for calculation of the analytical result. The measurement time interval and/or measurement vector may be selected with respect to time development of the current response. Additionally or alternatively, at least two different measurement time points or at least one measurement time interval may be selected for calculation of the analytical result.

The $DC_i$ response value at the DC time point may fulfill certain quality conditions, such as time points which allow differentiation of various interference effects.

The excitation voltage signal may be applied to the measurement electrodes and the response is measured and evaluated and split up into the phase and the impedance information for each frequency of the AC current response and the corresponding DC response at that time point. The simultaneously obtained $DC_i$ response values for a number of DC time points may be picked from the whole test sequence and may be stored and, after the measurement, used to calculate the concentration. The method may comprise at least one storage step, wherein in the storage step the DC current response is stored for a suitable number of time points of the test sequence, for example in at least one look-up table. The DC current response may be stored by the evaluation device, for example in at least one data storage device and/or data carrier of the evaluation device. The number of selected DC time points and/or a selection of DC time points may depend on one or more of a quality of time points, the DC profile such as profile shape and/or characteristics, length or duration of test sequence, expected interferences, time development of analyte reaction, kinetics of analyte reaction. For example, the DC time points may be evenly spaced over a specific period, e.g., the test sequence, or may be spaced at varying intervals from one another. The DC time points may be selected such that at least at each DC voltage step one DC time point is selected. For example, in case of three DC voltage steps, for each voltage step at least four DC time points may be selected.

The method may comprise at least one calibration step. For example, the method may comprise a lot calibration step, wherein the measured response may be re-scaled in order to reduce interference effects generated by test element production tolerances with impact on a test element cell constant. Interference effects generated by test element production tolerances with impact on the test element cell constant, e.g., capillary height and width, reagent thickness, may be reduced by re-scaling the measurement response. Based on test measurements with adjusted blood samples the measurement response may be re-scaled versus equivalent data obtained with a specially selected master lot. The re-scaling may be applied directly on the measured response, i.e., the observable. Scaling factors may be or may be determined from a ratio of the analytical result determined with a test element to be calibrated and the analytical result determined with a known test element, i.e., a test element having known properties. Additionally or alternatively, each of the mathematical terms of the predetermined relationship may be re-scaled. For example, the scaling factors may be or may be determined from ratios of the each of mathematical terms for the test element to be calibrated and of the corresponding mathematical term determined with a known test element. The measurement may be capable of identifying a strip lot directly from each test element to avoid calibration data mismatch. In the determination step, the concentration of the analyte may be determined by using information from the calibration steps.

The method further may comprise determining activation times, like the thrombin activation as an indicator for a blood coagulation time. The test element may comprise a reagent, which covers a working electrode and at least one counter-reference electrode to allow an amperometric current response, when a suitable DC voltage is applied. The reagent may comprise a coagulation start reagent and a peptide substrate with a linked redox tag. At an end of a coagulation reaction in the blood sample dosed to the test element, the protease thrombin may be activated and cleavages the redox tag from the peptide substrate. When a suitable DC voltage is applied between the measurement electrodes, the start of the redox tag cut-off can be detected. The time from dissolving the reagent by the blood sample until the redox tag cleavage may be the activation time. The activation time may be detected, if a predetermined threshold is exceeded, which may be stored, for example in the evaluation device. The current response may depend on the blood hematocrit level and on the temperature. The test elements may be thermostatically controlled, e.g., to 37° C., in or to compensate temperature sensitivity. The AC impedance may be used to correct the effect of varying hematocrit levels, which influences the time when the threshold is crossed and residual temperature variation. In known methods, e.g., sequential measurement with measuring the impedance at one time and the DC threshold exceeding at another time in dependency on the coagulation properties of the sample, the correction performance may be limited due to all kinds of gradient effects. These effects may be, for example ambient temperature variations, sample evaporation and drying or reagent fluctuation. Instead, in the method according to the present disclosure simultaneous poly frequent AC and DC profile are applied, such that the complex impedance measurement can be used, to correct the DC response always at the right time point, when the threshold is crossed and also at time points, where other useful DC response information is collected, e.g., background current correction or fail safe measurements.

The method may comprise a temperature calibration. The temperature calibration may comprise determining if a temperature, in particular in a dissolved reagent, is, during the measuring time, within allowed and/or predetermined limit. The temperature calibration may comprise calibrating poly frequent impedance AC responses from the measured test element with all relevant sample types versus a reference temperature. This method step may be performed in a climate chamber. By the temperature calibration it is possible to determine during the total measuring time, if the temperature is continuously in the allowed range and to compensate effects due to temperature and/or to issue an error message or warning. As used herein, the term "allowed range" refers to an allowed measurement deviation from a desired and/or selected measurement value. For example, the allowed range may be an allowed measurement deviation from a desired and/or selected activation time depending on the temperature. The allowed range may be determined and/or selected. Limits of the allowable range may be stored as fail-safe limits, e.g., within a memory of the analytical device, for example of the evaluation device.

The method, furthermore, may comprise at least one fail safe step. The response from the simultaneous poly frequent AC and DC profile excitations may be used to perform at least one fail safe step, wherein the fail safe step may comprise determining if the analyte concentration, i.e., a measured result, is valid within predetermined limits. For example, the predetermined limits may be between +/−7 mg/dl (for glucose concentrations below 100 mg/dl) and +/−10 percent (for glucose concentrations above 100 mg/dl) for 99% of all determined analytical results. The fails safe step may comprise issuing and/or displaying an error message in case the analyte concentration is not within the predetermined limits. In particular, the fails safe step may comprise preventing issuing and/or displaying the analytical result and issuing and/or displaying an error message in case the analyte concentration exceeds predetermined limits, for example +/−15 mg/dl/20%. The method may comprise determining failure modes, for example, if the test element is out of specification, or sample and test conditions are outside the claimed ranges or handling errors by the users. The predetermined relationship may be determined in consideration of relevant failure modes. For example, the respective mathematical function and weighting coefficients and training data set may be determined and/or selected with respect to the relevant failure mode. The fail safe step may comprise storing, e.g., within a measurement engine electronic, for example, of the evaluation device, the determined predetermined relationship and determined analyte concentration. The fail safe step may allow a measurement data consistency check. The fail safe step may comprise displaying a warning and/or error messages. The fails safe step may comprise determining at least one identifier, for example a formula, from a training data set which is suitable to differentiate analytical results outside predetermined limits from "real" analytical results, i.e., analytical results within the predetermined limits. The training data set may comprise incorrect or faulty test elements. Furthermore, the fails safe step may comprise determining test values which are suitable to identify and/or to clearly differentiate specific fault cases. Test values corresponding to real analytical results may lie within a predetermined test value range and/or may exhibit low scattering. Test values may be one or more of at least one measurement value, a combination of a plurality of measurement values, e.g., products, ratios, differences. The fails safe step further may comprise using at least one decision tree matrix. For example, the analytical result may be considered faulty in case a ratio of two measurement values, for example denoted as A and B, is above a predetermined first limit but smaller than a predetermined second limit, and if at the same time a third measurement value, denoted as C, minus three times a fourth measurement value, denoted as D, is smaller than a third predetermined limit.

The disclosure further discloses and proposes a computer program including computer-executable instructions for performing the method according to the present disclosure in one or more of the embodiments enclosed herein, when the program is executed on a computer or computer network. Specifically, the computer program may be stored on a computer-readable data carrier. Thus, specifically, one, more than one or even all of method steps, as indicated above, may be performed by using a computer or a computer network, typically by using a computer program.

The disclosure further provides and proposes a computer program product having program code means, in order to perform the method according to the present disclosure in one or more of the embodiments enclosed herein, when the program is executed on a computer or computer network. Specifically, the program code means may be stored on a computer-readable data carrier.

Further, the disclosure provides and proposes a data carrier having a data structure stored thereon, which, after loading into a computer or computer network, such as into a working memory or main memory of the computer or computer network, may execute the method according to one or more of the embodiments disclosed herein.

The disclosure further proposes and provides a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, the disclosure proposes and provides a modulated data signal which contains instructions readable by a computer system or computer network, for performing the method according to one or more of the embodiments disclosed herein.

Typically, referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present disclosure further provides:

A computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

In a further embodiment of the present disclosure, an analytical device for determining a concentration of at least one analyte in bodily fluid is disclosed. The analytical device comprises:

at least one signal generator device adapted to generate at least one excitation voltage signal, wherein the excitation voltage signal comprises at least one poly frequent alternating current (AC) voltage and at least one direct current (DC) voltage profile, wherein the poly frequent AC voltage comprises at least two frequencies;

at least one measurement unit, wherein the measurement unit is adapted to receive a response, at least one evaluation device adapted to evaluate an AC current response for each frequency and a DC current response from the response, wherein the evaluation device is adapted to evaluate for each frequency at least one phase information and at least one impedance information is evaluated from the AC current response, wherein the evaluation device is adapted to determine a concentration of the analyte from the DC current response and from one or both of the phase information and impedance information by using at least one predetermined relationship.

For definitions of the features of the analytical device and for optional details of the analytical device, reference may be made to one or more of the embodiments of the method as disclosed above or as disclosed in further detail below.

The term "measuring unit" generally may refer to an arbitrary device, typically an electronic device, which may be configured to detect at least one signal, in particular the response. The measurement unit may be adapted to receive a response at at least two different measurement time points.

The signal generator may be adapted to apply the excitation voltage signal to at least two measurement electrodes of at least one test element. The analytical device may be handled independently from a test element and may be adapted to interact with the test element in order to perform an analysis, such as by detecting the at least one response. Thus, the term "analytical device" may often also be referred to as a measurement device, an analytical device, a meter or a test device.

The analytical device may be adapted to perform the method for determining a concentration of at least one analyte in bodily fluid according to one or more of the embodiments of the method according to the present disclosure.

In a further embodiment of the present disclosure, a test element analysis system for determining a concentration of at least one analyte in bodily fluid is provided. The test element analysis system comprises:

at least one analytical device according to one or more of the embodiments of the analytical device according to the present disclosure;

at least one test element having at least one measuring zone capable of performing at least one change being characteristic for the analyte, wherein the test element comprises at least two measuring electrodes.

For definitions of the features of the test element analysis system and for optional details of the test element analysis system, reference may be made to one or more of the embodiments of the method and analytical device as disclosed above or as disclosed in further detail below. Specifically, the test element analysis system may be embodied having the features referring to the analytical device according to one or more of the embodiments of the analytical device.

As further used herein, the term "system" refers to an arbitrary set of interacting or interdependent component parts forming a whole. Specifically, the components may interact with each other in order to fulfill at least one common function. The at least two components may be handled independently or may be coupled or connectable. Thus, the term "test element analysis system" generally refers to a group of at least two elements or components which are capable of interacting in order to perform at least one analytical detection by interacting with an arbitrary test element, specifically at least one analytical detection of at least one analyte of the sample. The test element analysis system may generally also be referred to as an analytical system, an analytical kit, a sensor system or a measurement system.

The term "test element" generally may refer to an arbitrary device which is capable of detecting the analyte in the sample or of determining the parameter of the sample. The test element may specifically be a strip-shaped test element. As used herein, the term "strip-shaped" refers to an element having an elongated shape and a thickness, wherein an extension of the element in a lateral dimension exceeds the thickness of the element, such as by at least a factor of 2, typically by at least a factor of 5, more typically by at least a factor of 10, and most typically by at least a factor of 20 or even at least a factor of 30. Thus, the test element may also be referred to as test strip.

The test element may comprise at least one component or at least one reagent which changes at least one detectable property when the analyte is present in the sample such as a test chemistry. The term "test chemistry", also referred to as a test chemical, may refer to an arbitrary material or a composition of materials adapted to change at least one detectable property in the presence of the analyte. Generally, this property may be selected from an electrochemically detectable property and/or an optically detectable property, such as a color change and/or a change in re-missive properties. Specifically, the test chemistry may be a highly selective test chemistry, which only changes the property if the analyte is present in the sample of the body fluid applied to the test element, whereas no change occurs if the analyte is not present. More typically, the degree or change of the property may be dependent on the concentration of the analyte in the body fluid, in order to allow for a quantitative detection of the analyte.

Specifically, the test element may comprise at least one reagent configured for activating a coagulation of components of the body fluid. The reagent may comprise reactive components of thromboplastin and a peptide substrate. Thus, in case the reagent is exposed to the sample, the thromboplastin may activate a clotting and thrombin may be generated. Thrombin may cleave the peptide substrate and an electrochemical signal may be generated. The electrochemical signal may be evaluated with regard to a time of its occurrence. However, other reagents and/or measurement principles may be feasible.

As used herein, the term "electrochemical detection" refers to a detection of an electrochemically detectable property of the analyte by electrochemical means, such as an electrochemical detection reaction. Thus, for example, the electrochemical detection reaction may be detected by comparing one or more electrode potentials, such as a potential of a working electrode with the potential of one or more further electrodes such as a counter electrode or a reference electrode. The detection may be analyte specific. The detection may be a qualitative and/or a quantitative detection.

The test element may have the at least one measuring zone capable of performing at least one change being characteristic for the analyte or the parameter. As further used herein, the term "measuring zone" may refer to an arbitrary area or region of an object wherein an arbitrary measurement, specifically an analytical measurement, is conducted. Specifically, the test chemistry as described above may be located within the measuring zone, particularly on a surface of the measuring zone. The test element may be an electrochemical test element.

The term "electrochemical test element" may refer to an arbitrary test element configured for conducting at least one electrochemical detection. As used herein, the term "electrochemical detection" refers to a detection of an electrochemically detectable property of at least one arbitrary analyte, such as an electrochemical detection reaction. Thus, for example, the electrochemical detection reaction may be detected by comparing one or more electrode potentials, such as an electrostatic potential of a working electrode with the electrostatic potential of one or more further electrodes such as a counter electrode or a reference electrode. The detection may be analyte specific. The detection may be a qualitative and/or a quantitative detection.

The test element may comprise at least one capillary configured for receiving the sample. The term "capillary" generally refers to an arbitrary small, elongate void volume such as a small tube. Generally, the capillary may comprise dimensions in the millimeter or sub-millimeter range. Commonly, a fluidic medium may migrate through the capillary by capillary action, wherein the fluidic medium may flow in narrow spaces of the capillary without an assistance of external forces like gravity due to intermolecular forces between the fluidic medium and a surface of the capillary facing the fluidic medium. For example, the test element may have at least one face to face electrode configuration. The test element may have at least one capillary open at three sides. Facing electrode surfaces may be coated with an absorbent reagent layer, such that the sample is absorbed and spread via the reagent coating. Facing electrode surfaces may be conductively connected by using a liquid layer.

The analytical device may comprise a test element holder. The term "test element holder" generally may refer to an arbitrary object which is configured to receive or to hold an arbitrary test element. Specifically, the test element may be positioned on a specific position within the test element holder, such that a movement of the test element in at least one direction may be suppressed, at least to a large extent. Thus, the measurement zone of the test element may be located in a predetermined position relative to the measuring unit. The test element may specifically be configured to be put reversibly into the test element holder. Thus, the test element may be removable form the test element holder without further ado. Still, other embodiments are feasible. The test element may be at least partially received in the test element holder. The term "being received" may generally refer to a condition of an object as being located or inserted fully or at least partially into a receptacle or into an opening of another element. Thus, a part of the object may be located outside of the other element. Exemplarily, the test element holder may comprise at least one receptacle configured for receiving the test element. Thus, the receptacle may be shaped complementarily to the test element. Therefore, the receptacle and the test element may be configured to establish a form-fit connection. The test element holder may comprise at least one contact element which allows an electrical contact between the test element and the test element holder.

The proposed method, analytical device and test element analysis system provide many advantages over known devices and methods. In particular, the proposed method, analytical device and test element analysis system allow determination of concentration of the analyte in consideration of interference effects and production tolerances. By applying the excitation voltage signal composed AC voltage having different frequencies and the DC voltage profile, it may be possible to get the best possible performance, e.g., from a test strip based analyte concentration or sample property measurement in a whole blood sample, by considering all relevant interference effects and strip production tolerances. The phase information and/or at least one impedance information of each frequency of the AC current response in combination with the DC current response may allow obtaining differentiable information of interference effects and production tolerances.

Summarizing the findings of the present disclosure, the following embodiments are typical:

Embodiment 1

A method for determining a concentration of at least one analyte in bodily fluid, the method comprising the following steps:
- at least one signal generation step, wherein at least one excitation voltage signal is generated by at least one signal generator device, wherein the excitation voltage signal comprises at least one poly frequent alternating current (AC) voltage and at least one direct current (DC) voltage profile, wherein the poly frequent AC voltage comprises at least two frequencies;
- at least one signal application step, wherein the excitation voltage signal is applied to at least two measurement electrodes;
- at least one measurement step, wherein a response is measured by using the measurement electrodes;
- at least one evaluation step, wherein an AC current response for each frequency and a DC current response are evaluated from the response by at least one evaluation device, and wherein for each frequency at least one phase information and at least one impedance information is evaluated from the AC current response by the evaluation device;
- at least one determination step, wherein the concentration of the analyte is determined from the DC current response and from one or both of the phase information and impedance information by using at least one predetermined relationship.

Embodiment 2

The method according to the preceding embodiment, wherein the AC voltage and DC profile are superimposed to form the excitation voltage signal.

Embodiment 3

The method according to the preceding embodiment, wherein the predetermined relationship is $$bG = \Sigma_{i=1}^{n} a_i DC_i e^{\Sigma_{m=1}^{f} b_{mi} Y_{mi} + c_{mi} P_{mi}},$$

wherein bG is the determined analyte concentration, i denotes the number of measurement time points, wherein i, n, f and m are natural integer numbers, m denotes the number of frequencies, $a_i$, $b_i$, $c_i$ are weighting coefficients, $Y_{mj}$ are admittance values from AC response at different frequencies at time points, $P_{mj}$ are phase angle values from AC response at different frequencies at time points and $DC_i$ are DC response values at selected DC response time points.

Embodiment 4

The method according to embodiment 1, wherein the predetermined relationship is $$bG = \sum_{i=1}^{n} \sum_{m=1}^{f} \left( \frac{a_{mi} DC_i}{Y_{(imag)mi}} + \frac{b_{mi} DC_i}{Y_{(real)mi}} \right),$$

wherein bG is the determined analyte concentration, i denotes the number of measurement time points, wherein i, n, f and m are natural integer numbers, m denotes the number of frequencies, $a_i$ and $b_i$ are weighting coefficients, $Y_{(imag)mi}$ and $Y_{(real)mi}$ are real and imaginary parts of admittance values from AC response at different frequencies at time points and $DC_i$ are DC response values at selected DC response time points.

Embodiment 5

The method according to the preceding embodiment, wherein the predetermined relationship is, $$bG = \sum_{\substack{i,j=1 \\ i \neq j}}^{n} \left( \frac{a_i DC_i}{Y_i} + b_i \left( \frac{DC_i}{Y_i} \cdot \frac{DC_j}{Y_j} \right) \right),$$

wherein bG is the determined concentration of the analyte, i and j denote the number of measurement time points, wherein i, j and n are natural integer numbers, $a_i$, $b_i$ and $c_i$ are weighting coefficients, $Y_i$, and $Y_j$ are either real or imaginary parts of admittance values from AC response at different frequencies at time points i and j. $DC_i$, $DC_j$ are DC response values at selected DC response time points.

Embodiment 6

The method according to any one of the two preceding embodiments, wherein the predetermined relationship is, $$bG = \sum_{\substack{i,j=1 \\ i \neq j}}^{n} \sum_{\substack{m,l=1 \\ m \neq l}}^{f} \left( \frac{a_{mi} DC_i}{Y_{(imag)mi}} + \frac{b_{mi} DC_i}{Y_{(real)mi}} + c_{mi} \left( \frac{DC_i}{Y_{(imag)mj}} \cdot \frac{DC_j}{Y_{(real)li}} \right) \right),$$

wherein bG is the determined concentration of the analyte, i and j denote the number of measurement time points, wherein i, j, n, f, m and l are natural integer numbers, m and l denote the number of frequencies, $a_i$, $b_i$ and $c_i$ are weighting coefficients, $Y_{(imag)mi}$, $Y_{(real)mi}$ $Y_{(imag)mj}$ and $Y_{(real)mj}$ are real and imaginary parts of admittance values from AC response at different frequencies at time points i and j and $DC_i$, DCj are DC response values at selected DC response time points.

Embodiment 7

The method according to any one of the preceding embodiments, wherein for each frequency at least one real and imaginary part of admittance is evaluated from the AC current response by the evaluation device.

Embodiment 8

The method according to any one of the preceding embodiments, wherein the method comprises determining a predetermined relationship between the concentration of the analyte and the DC current response, the phase information and impedance information.

Embodiment 9

The method according to any one of the preceding embodiments, wherein in the determination step the concentration of the analyte is determined in consideration of interference effects and production tolerances.

Embodiment 10

The method according to the preceding embodiment, wherein interference effects are selected from the group consisting of ambient conditions, in particular temperature and humidity; sample properties, in particular sample temperature, hematocrit level, protein level, and ionic strength.

Embodiment 11

The method according to any one of the preceding embodiments, wherein the bodily fluid is whole blood.

Embodiment 12

The method according to any one of the preceding embodiments, wherein the analyte is glucose.

Embodiment 13

The method according to any one of the preceding embodiments, wherein the poly frequent AC voltage comprises at least three frequencies.

Embodiment 14

The method according to any one of the preceding embodiments, wherein the AC voltage has a magnitude less than 30 mV rms.

Embodiment 15

The method according to any one of the preceding embodiments, wherein the method further comprises at least one selection step, wherein in the selection step from the measurement time points at least one DC time point is selected, wherein the DC time point is a time point at which the DC response current is used in the determination step.

Embodiment 16

The method according to the preceding embodiment, wherein the DC time point fulfills certain quality conditions.

Embodiment 17

The method according to any one of the preceding embodiments, wherein the DC voltage profile comprises a time profile.

Embodiment 18

The method according to any one of the preceding embodiments, wherein DC voltage profile is selected from the group consisting of: a voltammetric voltage profile; an amperometric voltage profile.

Embodiment 19

The method according to any one of the preceding embodiments, wherein the excitation voltage signal is applied during at least one test sequence.

Embodiment 20

The method according to the preceding embodiment, wherein the method comprises at least one storage step, wherein in the storage step the DC current response is stored for a suitable number of time points of the test sequence.

Embodiment 21

The method according to any one of the preceding embodiments, wherein the method comprises at least one calibration step.

Embodiment 22

The method according to the preceding embodiment, wherein the method furthermore comprises at least one lot calibration step, wherein the measured response may be re-scaled

Embodiment 23

The method according to any one of the two preceding embodiments, wherein in the determination step the concentration of the analyte is determined by using information from the calibration step.

Embodiment 24

The method according to any one of the preceding embodiments, wherein in the evaluation step the AC current response and the DC current response are separated using at least one two-way analog electronic filter, which splits the signals between about 100 Hz and 500 Hz, wherein below 100 Hz the response is analyzed as DC and above 500 Hz it is analyzed as AC.

Embodiment 25

The method according to any one of the preceding embodiments, wherein the predetermined relationship is one or more of selected, determined and verified by mathematical methods selected from the group consisting of multivariate analysis, neuronal nets, moving mesh, lasso method, boosted random forest and bootstrapping, on at least one training data set.

Embodiment 26

The method according to any one of the preceding embodiments, wherein the method comprises determining activation times.

Embodiment 27

The method according to any one of the preceding embodiments, wherein the method comprises a temperature calibration, wherein the temperature calibration comprises determining if a temperature is, during the measuring time, within allowed and/or predetermined limit.

Embodiment 28

The method according to any one of the preceding embodiments, wherein the method comprises at least one fail safe step, wherein the fail safe step comprises determining if the analyte concentration is valid within predetermined limits.

Embodiment 29

The method according to any one of the preceding embodiments, wherein the method comprises a sample application step, wherein a sample of bodily fluid is brought in contact with the measurement electrodes.

Embodiment 30

A computer program including computer-executable instructions for performing the method for determining a concentration of at least one analyte in bodily fluid according to any of the preceding embodiments when the program is executed on a computer or computer network.

Embodiment 31

A computer-readable medium having computer-executable instructions for performing the method for determining a concentration of at least one analyte in bodily fluid according to any of the preceding embodiments, wherein the computing device is provided by a computer.

Embodiment 32

A computer program product with program code means stored on a machine-readable carrier, in order to perform the method for determining a concentration of at least one analyte in bodily fluid according to any of the preceding embodiments, when the program is executed on a computer or computer network.

Embodiment 33

An analytical device for determining a concentration of at least one analyte in bodily fluid, the analytical device comprising:
  at least one signal generator device adapted to generate at least one excitation voltage signal, wherein the excitation voltage signal comprises at least one poly frequent alternating current (AC) voltage and at least one direct current (DC) voltage profile, wherein the poly frequent AC voltage comprises at least two frequencies;
  at least one measurement unit, wherein the measurement unit is adapted to receive a response,
  at least one evaluation device adapted to evaluate an AC current response for each frequency and a DC current response from the response, wherein the evaluation device is adapted to evaluate for each frequency at least one phase information and at least one impedance information is evaluated from the AC current response, wherein the evaluation device is adapted to determine a concentration of the analyte from the DC current response and from one or both of the phase information and impedance information by using at least one predetermined relationship.

Embodiment 34

The analytical device according to the preceding embodiment, wherein the signal generator is adapted to apply the excitation voltage signal to at least two measurement electrodes of at least one test element.

Embodiment 35

The analytical device according to any one of the two preceding embodiments, wherein the analytical device is adapted to perform the method for determining a concentration of at least one analyte in bodily fluid according to any of the preceding embodiments referring to a method.

Embodiment 36

A test element analysis system for determining a concentration of at least one analyte in bodily fluid, comprising:

at least one analytical device according to any of the preceding embodiments referring to an analytical device;

at least one test element having at least one measuring zone capable of performing at least one change being characteristic for the analyte, wherein the test element comprises at least two measuring electrodes.

Embodiment 37

The test element analysis system according to the preceding embodiment, wherein the test element is an electrochemical test element.

Embodiment 38

The test element analysis system according to any one of the preceding embodiments referring to a test element analysis system, wherein the test element comprises at least one capillary configured for receiving a sample of bodily fluid.

Embodiment 39

The test element analysis system according to any one of the preceding embodiments referring to a test element analysis system, wherein the analytical device comprises at least one test element holder for positioning the test element.

In order that the embodiments of the present disclosure may be more readily understood, reference is made to the following examples, which are intended to illustrate the disclosure, but not limit the scope thereof.

In FIG. 1, a schematic overview of an exemplary embodiment of a method for determining a concentration of at least one analyte in bodily fluid is shown. The method comprises at least one signal generation step 110. In the signal generation step 110 at least one excitation voltage signal may be generated by at least one signal generator device 112. The excitation voltage signal comprises at least one poly frequent alternating current (AC) voltage and at least one direct current (DC) voltage profile.

Figure 4:
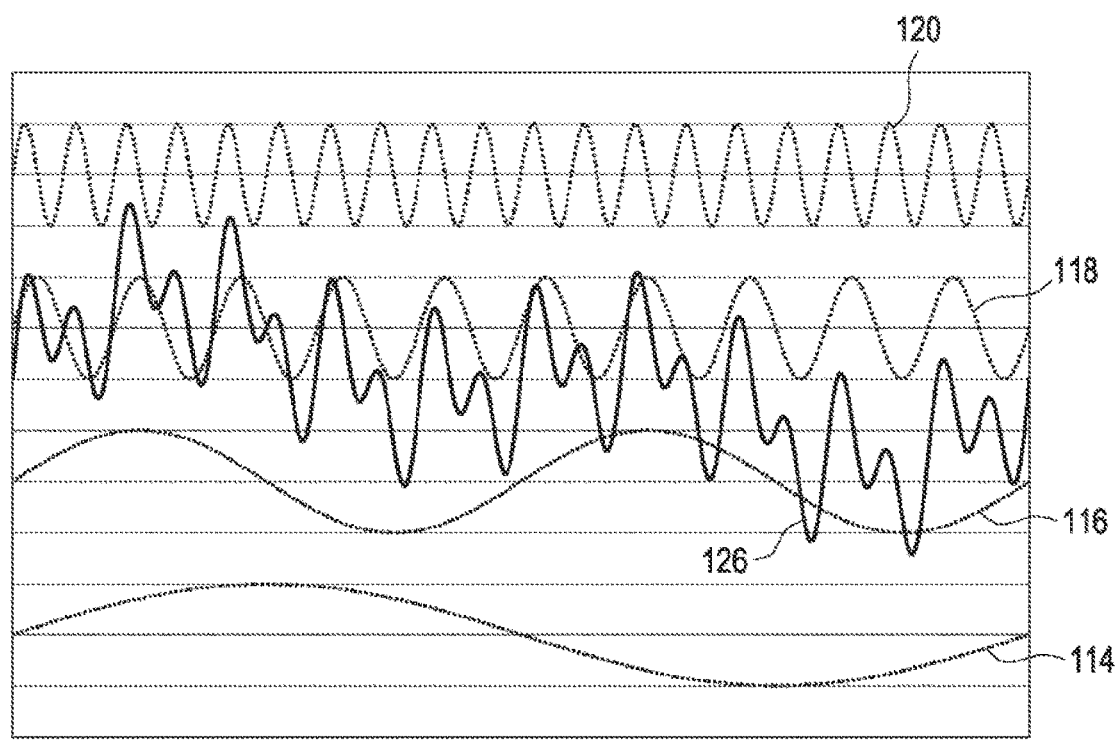
FIG. 4 shows an embodiment of a composition of a poly frequent AC voltage.

The poly frequent AC voltage comprises at least two frequencies. The AC voltage may have a sine waveform. Other wave forms are feasible. For example, the AC voltage may comprise at least two AC sine waves having different frequencies. The AC voltage may comprise at least two AC sine waves having different frequencies, wherein the two AC signals are superimposed. The poly frequent AC voltage may comprise three, four or more frequencies. The frequencies may be in the range of 500 Hz to 20 kHz. In FIG. 4 a schematic embodiment of a composition of the poly frequent AC voltage is shown. The poly frequent AC voltage may comprise four superimposed frequencies, for example, 1 kHz (denoted with reference number 114), 2 kHz (denoted with reference number 116), 10 kHz (denoted with reference number 118) and 20 kHz (denoted with reference number 120). The signal generator device 112 may comprise at least one AC-voltage source 122 and at least one DC-voltage source 124. The signal generator device 112 may be adapted to generate the at least one poly frequent AC voltage. For example, the signal generator 112 may be adapted to generate multiple AC voltage signals 114, 116, 118, 120 each having different frequencies and to sum up the multiple AC signals. The summed signal is denoted with reference number 126 in FIG. 4. The AC voltage, in particular the summed signal, may have a magnitude or amplitude such that no faradic current response is generated. For example, in the embodiment shown in FIG. 4, each of the AC voltage signals 114, 116, 118, 120 may have a magnitude less or equal 10 mV rms and the magnitude of the AC voltage 126 may be less than 30 mV rms.

The signal generator device 112 may be adapted to generate at least one DC profile. The DC voltage profile may comprise a time profile. The DC voltage may be changed and/or may be varied continuously or stepwise during a measurement time. For example, the DC voltage may comprise at least one step sequence. For example, the DC voltage profile may comprise at least two voltage steps. For example, the DC voltage profile may comprise three, four or five voltage steps. Even more voltage steps are feasible. The steps of the DC voltage profile may be selected to allow for a differentiation between an analytical reaction and various interference reactions. The DC voltage may have a rectangular waveform. Other waveforms are feasible. The DC voltage profile may be selected from the group consisting of: a voltammetric voltage profile; an amperometric voltage profile.

The AC voltage and DC profile may be superimposed. The signal generator device 112 may be adapted to apply the AC voltage and DC profile simultaneously to the bodily fluid. The signal generator device 112 may be adapted to apply the excitation voltage signal comprising superimposed poly frequent AC voltage and DC profile to the bodily fluid. The signal generator device 112 may be part of the measurement electronics and/or may be connected to the measurement electronics, for example of at least one evaluation device 128. The signal generator 112 may be part of the evaluation device 128 or may be designed as a separate device.

The method further comprises at least one signal application step 130, wherein the excitation voltage signal is applied to at least two measurement electrodes 132. The method comprises at least one measurement step 134. In the measurement step 134 a response is measured. The response may be measured at at least two different measurement time points by using the measurement electrodes 132. The method comprises at least one evaluation step 136, wherein an AC current response for each frequency and a DC current response are evaluated from the response by at least one evaluation device 128, and wherein for each frequency at least one phase information and at least one impedance information is evaluated from the AC current response by the evaluation device 128. The method comprises at least one determination step 138, wherein the concentration of the analyte is determined from the DC current response and from one or both of the phase information and impedance information by using at least one predetermined relationship.

Figure 2:
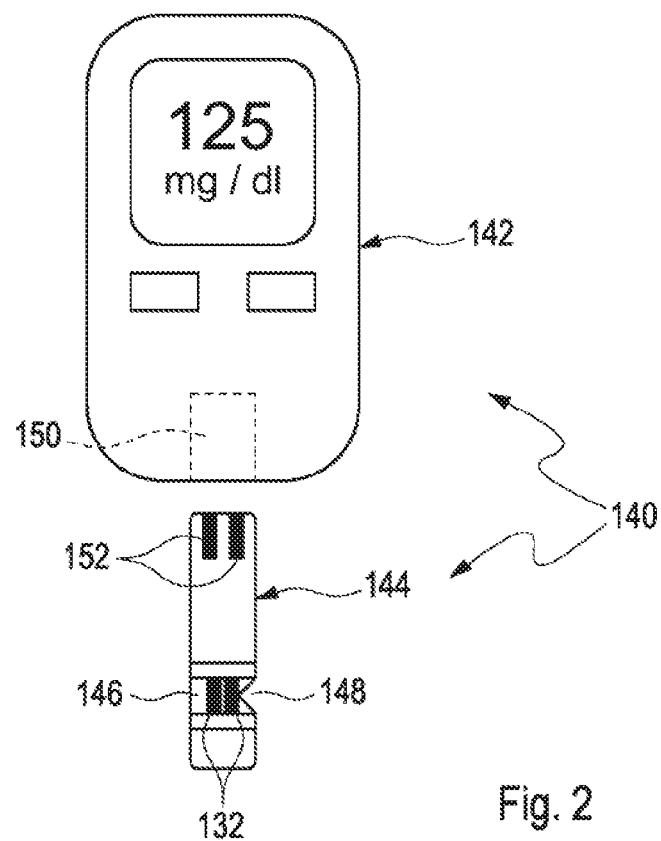
FIG. 2 shows an embodiment of test element analysis system.

In FIG. 2 an embodiment of test element analysis system 140 is depicted. The test element analysis system 140 comprises at least one analytical device 142 and at least one test element 144 having at least one measuring zone 146 capable of performing at least one change being characteristic for the analyte, wherein the test element 144 comprises at least two measuring electrodes 132. The test element 144 may be a test strip. The test element 144 may comprise at least one sample opening 148 for applying the bodily fluid. The analytical device may comprise at least one test element holder 150. The test element 144 may be inserted into the analytical device 142. The test element 144 may comprise at least two electrical contacts 152 which are electrically connected to the at least two measuring electrodes 132. The analytical device 142 may be adapted to electrically contact the test element 144, in particular by contacting the electrical contacts 152.

Figure 3:
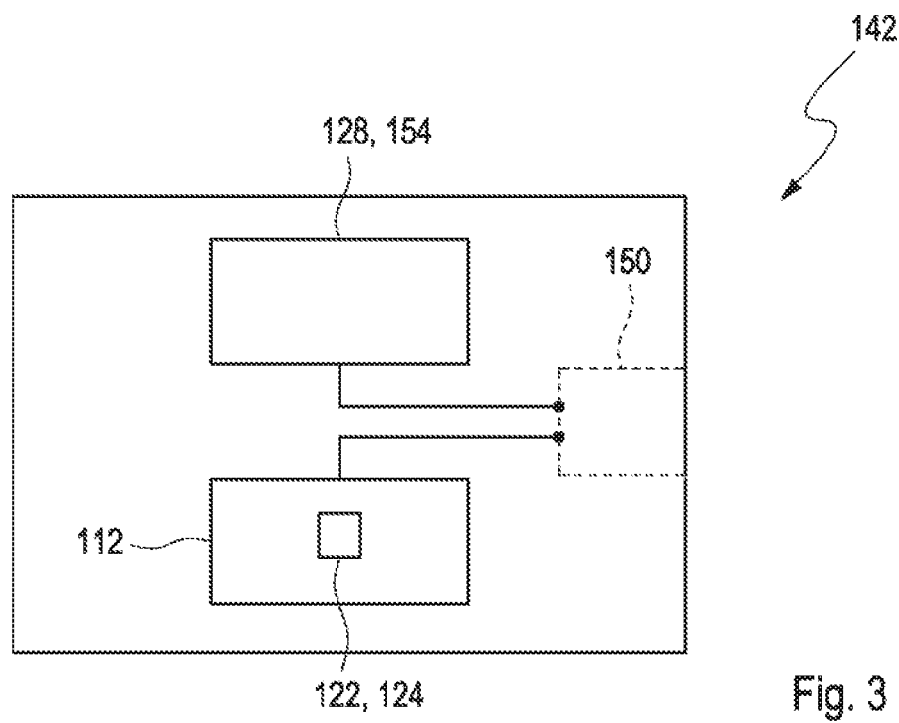
FIG. 3 shows an exemplary embodiment of an analytical device.

In FIG. 3 an exemplary embodiment of an analytical device 142 is highly schematically shown. The analytical device 142 comprises the at least one signal generator device 112 adapted to generate at least one excitation voltage signal, wherein the excitation voltage signal comprises at least one poly frequent alternating current (AC) voltage and at least one direct current (DC) voltage profile, wherein the poly frequent AC voltage comprises at least two frequencies. The analytical device 142 comprises at least one measurement unit 154, wherein the measurement unit 154 is adapted to receive a response, in particular at at least two different measurement time points. The analytical device 142 comprises at least one evaluation device 128. The measurement unit 145 may be part of the evaluation unit 128.

The evaluation device 128 is adapted to evaluate an AC current response for each frequency and a DC current response from the response. The evaluation device 128 is adapted to evaluate for each frequency at least one phase information and at least one impedance information from the AC current response. The evaluation device 128 is adapted to determine from the DC current response and from one or both of the phase information and impedance information a concentration of the analyte by using at least one predetermined relationship.

Figure 5:
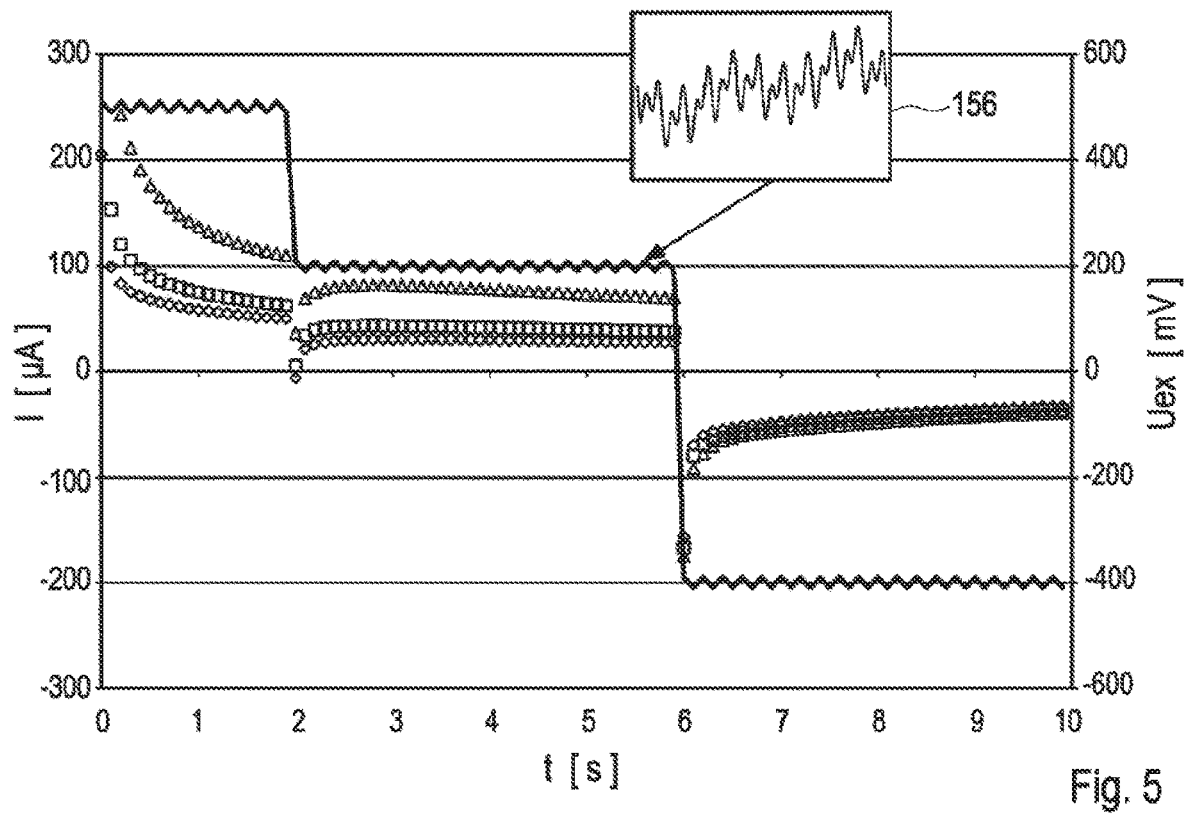
FIG. 5 shows development over time of an excitation voltage signal using an amperometric voltage profile as DC profile and DC response.

FIG. 5 shows a development over time of an excitation voltage signal using an amperometric voltage profile as DC profile and DC response. The method according to the present disclosure may be used to compensate bias caused by a high concentration of the interfering substance ascorbic acid onto a glucose measurement with a glucose test strip. The ascorbic acid may reduce a redox mediator in a detection reagent in competition to a glucose dehydrogenase enzyme and glucose and may cause a positive biased test result. In FIG. 5, the excitation voltage $U_{ex}$ in mV versus time t in seconds is depicted. In solid lines the excitation voltage signal is shown. The excitation signal comprises a poly frequent AC voltage, which is depicted magnified in box 156. In FIG. 5, the excitation voltage signal comprises three DC voltage steps to allow for a differentiation between the analytical reaction and various interference reactions. The excitation voltage signal may be applied between two measuring electrodes 132, where one electrode may be covered with a reagent to measure a glucose concentration and a second electrode covered with a silver/silver-chloride layer as counter-reference electrode. For example, the test element 144 may comprise two measurement electrodes 132 arranged as coplanar electrodes.

Figure 6:
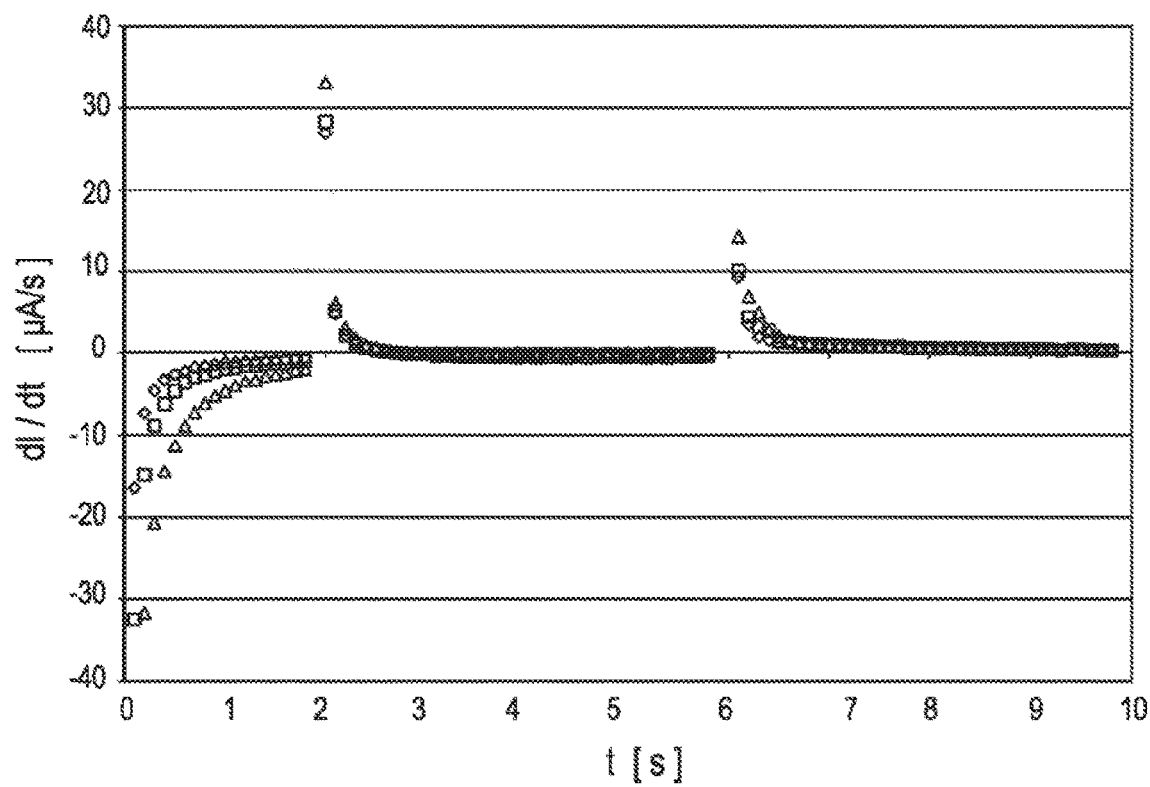
FIG. 6 shows development over time of a slope of the DC response.

In addition, in FIG. 5, the response I in μA versus time is shown for three samples for three levels of ascorbic acid with the same glucose concentration each: for 0 mg/dl ascorbic acid (shown as diamond), for 30 mg/dl ascorbic acid (shown as square) and for 100 mg/dl ascorbic acid (shown as triangle). When comparing the response of the sample containing only glucose to a sample which contains glucose and ascorbic acid, the response time profile may be different because of different reaction velocity of the competing reactions. For example, at early test times after a sample is dosed, e.g., within the first two seconds of the measurement, the difference can be seen. The ascorbic acid as a typical interfering substance may cause a positive bias of the DC response. At very first part of the response signal, within the first two seconds, a slope may be different due to the different velocities of the redox mediator reaction with the ascorbic acid and the reaction with the glucose enzyme system. In the following, DC response determined during the very first part of the response signal will be denoted at early DC time points. At a later time point, when the reactions are nearly finished, no differentiation may be possible. In the following, DC response determined during later time points of the response signal will be denoted at later DC time points. FIG. 6 shows, for the samples shown in FIG. 5, development over time of the slopes dI/dt in μA/s of the DC responses. The determination of the analyte concentration may comprise weighting the early DC time points and the later DC time points by using the predetermined relationship such that the ascorbic acid interference can be compensated.

When hematocrit levels of the blood sample or the ambient temperature are different or when the strips are aged, compared to the example shown in FIGS. 5 and 6, relation of the reaction velocities and magnitude of the DC responses may change. Such interference effects may be compensated by determining for each of the DC time points the corresponding results from the poly frequent impedance measurement at the same time point. The analyte concentration is determined from the DC current response and from one or both of the phase information and impedance information by using the predetermined relationship. To each observed DC response time point the AC current response from the simultaneous four-frequent AC excitation may be determined as four admittances and four phase angles.

For test elements having a coplanar electrode arrangement the predetermined relationship may be $$bG = \sum_{i=1}^{n} a_i DC_i e^{\sum_{m=1}^{f} b_{mi} Y_{mi} + c_{mi} P_{mi}},$$

wherein bG is the determined analyte concentration, i denotes the number of measurement time points, wherein i, n, f and m are natural integer numbers, m denotes the number of frequencies, $a_i$, $b_i$, $c_i$ are weighting coefficients, $Ym_i$ are admittance values from AC response at different frequencies at time points, $Pm_i$ are phase angle values from AC response at different frequencies at time points and $DC_i$ are DC response values at selected DC response time points.

The electrodes also can be arranged in a face to face configuration, where the active electrode surface is defined by isolating surrounding layers. The test element may have a capillary to transport a liquid sample and defining a measuring cell. To detect a sufficient fill level often separate electrodes following the measuring electrodes along the capillary channel are implemented to verify complete measuring electrode coverage. In case of unstructured face to face electrodes, active electrode surfaces may depend on a sample fill level. This effect can be compensated by using a specific predetermined relationship. For example, for test elements having a face to face electrode arrangement the predetermined relationship may be $$bG = \sum_{i=1}^{n} \sum_{m=1}^{f} \left( \frac{a_{mi} DC_i}{Y_{(imag)mi}} + \frac{b_{mi} DC_i}{Y_{(real)mi}} \right),$$

wherein bG is the determined analyte concentration, i denotes the number of measurement time points, wherein i, n, f and m are natural integer numbers, m denotes the number of frequencies, $a_i$ and $b_i$ are weighting coefficients, $Y_{(imag)mi}$ and $Y_{(real)mi}$ are real and imaginary parts of admittance values from AC response at different frequencies at time points and $DC_i$ are DC response values at selected DC response time points. In particular, the predetermined relationship may be, $$bG = \sum_{\substack{i,j=1 \\ i \neq j}}^{n} \left( \frac{a_i DC_i}{Y_i} + b_i \left( \frac{DC_i}{Y_i} \cdot \frac{DC_j}{Y_j} \right) \right),$$

wherein bG is the determined concentration of the analyte, i and j denote the number of measurement time points, wherein i, j and n are natural integer numbers, $a_i$, $b_i$ and $c_i$ are weighting coefficients, $Y_i$, and $Y_j$ are either real or imaginary parts of admittance values from AC response at different frequencies at time points i and j. $DC_i$, $DC_j$ are DC response values at selected DC response time points.

In one embodiment, the predetermined relationship may be $$bG = \sum_{\substack{i,j=1 \\ i \neq j}}^{n} \sum_{\substack{m,l=1 \\ m \neq l}}^{f} \left( \frac{a_{mi} DC_i}{Y_{(imag)mi}} + \frac{b_{mi} DC_i}{Y_{(real)mi}} + c_{mi} \left( \frac{DC_i}{Y_{(imag)mj}} \cdot \frac{DC_j}{Y_{(real)li}} \right) \right),$$

wherein bG is the determined concentration of the analyte, i and j denote the number of measurement time points, wherein i, j, n, f, m and l are natural integer numbers, m and l denote the number of frequencies, $a_i$, $b_i$ and $c_i$ are weighting coefficients, $Y_{(imag)mi}$, $Y_{(real)mi}$, $Y_{(imag)mj}$ and $Y_{(real)mj}$ are real and imaginary parts of admittance values from AC response at different frequencies at time points i and j, and $DC_i$, DCj are DC response values at selected DC response time points. This predetermined relationship may be used for test elements having face to face electrodes.

Figure 7:
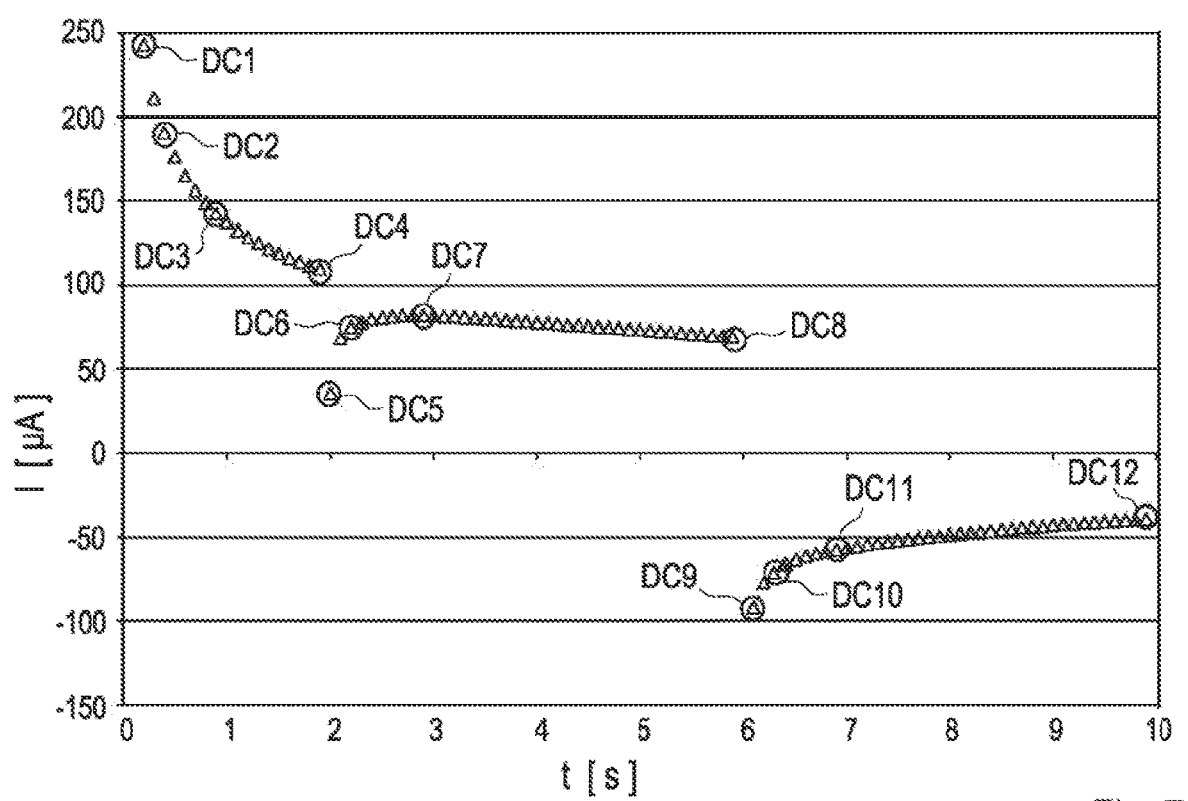
FIG. 7 shows an example of a selection of DC time points.

The method further may comprise at least one selection step, wherein in the selection step from the measurement time points at least one DC time point is selected. In the selection step from the measurement time points a number of DC time points may be selected. For example, three, four, five, six, ten or even twelve DC time points may be selected during at least one test sequence and/or during at least one voltage step of the excitation voltage signal during the test sequence. Even a higher number of DC time points may be feasible. The DC time point may be a time point at which the DC response current is used in the determination step. The DC time point may fulfill certain quality conditions, such as good correlation with the reference glucose values and with the various interference effects. FIG. 7 shows an example of the selection of DC time points for the 100 mg/dl ascorbic acid sample (shown as triangle) and excitation profile as described with respect to FIG. 5. In FIG. 7, twelve DC time points are selected, denoted as DC1 to DC12. For each DC voltage step four DC time points are selected, wherein two DC time points are selected at the beginning of each DC voltage step and two DC time points are selected at later time points during each DC voltage step. For each of the selected DC time points the $DC_i$ response value may be determined and or stored. At the same time point, i.e., the DC time point, the AC response value may be determined for each of the superimposed frequencies. The analyte concentration may be determined and/or calculated from the DC response values and the simultaneously determined AC response values by using the above described predetermined relationship with significantly reduced impact of interference effects.

The evaluation device 128 may be adapted to determine the predetermined relationship. The evaluation device 128 may be adapted to provide mathematical functions and weighting coefficients which, for example, may be stored in a data storage and/or look-up table of the evaluation device 128. The method may comprise at least one training step, wherein the predetermined relationship may be determined. The predetermined relationship, in particular weighting coefficients of the predetermined relationship, may be one or more of selected, determined and verified by mathematical methods selected from the group consisting of multivariate analysis, neuronal nets, moving mesh, lasso method, boosted random forest and bootstrapping, on at least one training data set. The training data set may be collected by performing co-variance studies. The training data set may comprise a suitable number of repeated measurements, for example with homogenous produced test elements, by applying a selected test sequence with connected electronic circuitry of a measurement device, for example a meter. To obtain the training data set the analyte concentration of each test sample may be determined with a reference method, for example hexokinase method in case of a glucose concentration. To obtain the training data set each combination of relevant combined interference effects may be tested across a relevant concentration range of the analyte with a sufficient amount of repetition for each test combination and test sample. For example, in the case of determining a glucose concentration in a blood sample the major interference effects may be ambient temperatures, hematocrit level, ionic strength, plasma concentrations, lipid concentration or administered interfering substances, especially antioxidants. In case of test elements with unstructured face to face electrodes, which may not comprise separate fill sufficient detection electrodes, a fill level of a capillary may be tested for the training data set generation. Another interference effect might be the storage time in a primary test element package or an impact of environmental condition and exposer time of a test element, e.g., a test strip, when the test element is taken out of the package before executing the measurement. If the test element is not sufficiently robust versus these impacts, also these factors may be considered when obtaining the training data set.

The predetermined relationship, in particular weighting coefficients, may be determined to get a concentration measurement result with the required performance. For the example of a determination of a glucose concentration, that means that the concentration of more than 95% of the measurements does not differ more than +/−10%, or 10 mg/dl, from the used reference method, when tested with all relevant sample material and test conditions. For example, a moving mesh method with random oscillating step size may be used to determine the weighting coefficient. The training step may comprise an optimization, wherein a minimum of an objective function is determined. As objective function a normalized error to the reference method equivalent to an MSD (mean square deviation) may be used:

objective function=Average[$\Sigma_{i=1}{}^{n}NE_i$]$^2$, wherein $NE_i$ is the normalized error:

$NE_i = bG_i - Gref_i$, for $Gref_i < 100$ mg/dl, or $NE_i = (bG_i - Gref_i)/Gref_i \cdot 100$, for $Gref_i > 100$ mg/dl, wherein $bG_i$ is the determined glucose concentration and $Gref_i$ is the glucose reference value.

Figure 8:
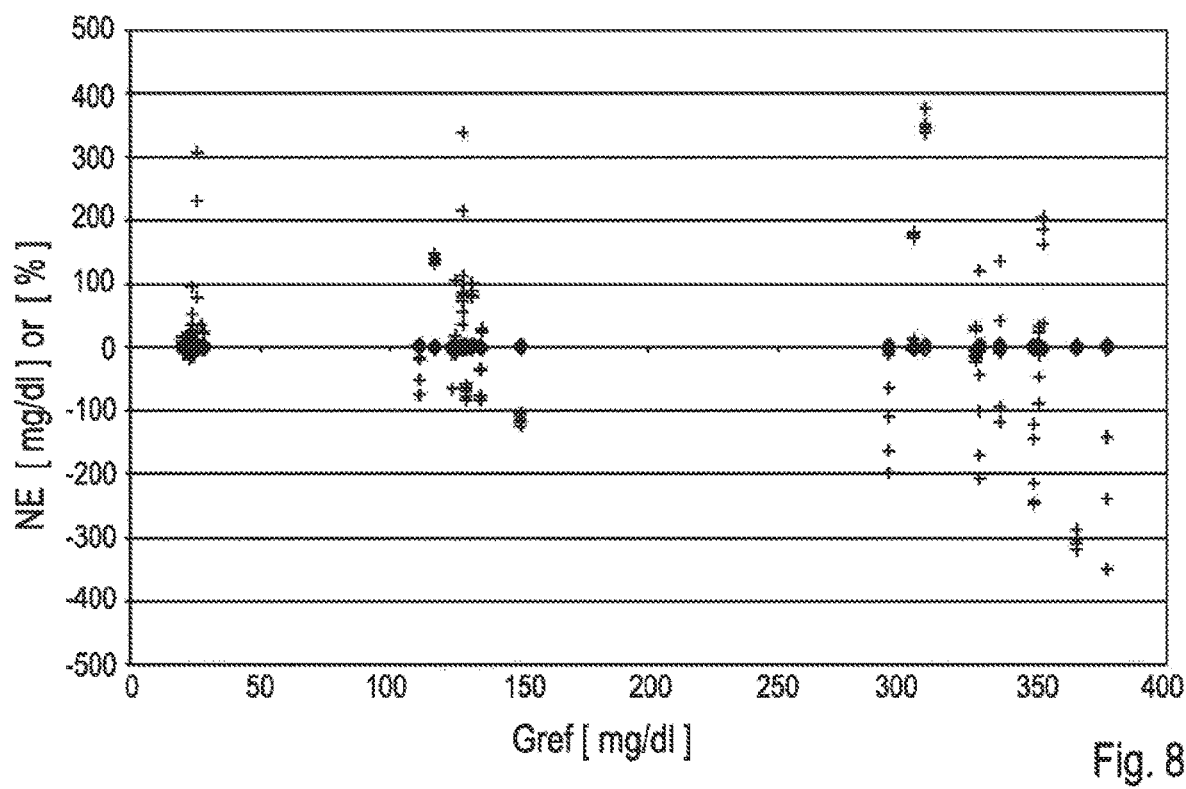
FIG. 8 shows experimental results for a face to face electrode test element.

FIG. 8 shows experimental results for a face to face electrode test element with a glucose enzyme-redox-mediator reagent on a gold surface as working electrode and a silver/silver-chloride counter-reference-electrode. The normalized error of the calculated glucose result versus the reference method is shown. For the experiment, blood samples of three glucose levels, each adjusted to hematocrit levels of 0, to 70%, are tested at ambient temperatures of 12, 23 and 40° C. Results are also included for blood samples spiked with a high concentration of up to 100 mg/dl ascorbic acid at the three glucose levels. Amperometric DC measurements, without using AC information, are depicted with crosses. Normalized errors for analyte concentrations using the method according to the present disclosure, e.g., using response of simultaneous poly frequent AC and three step DC, are depicted as diamonds and are 100% within a range of +/−5% or mg/dl for the shown training data set.

Figure 9:
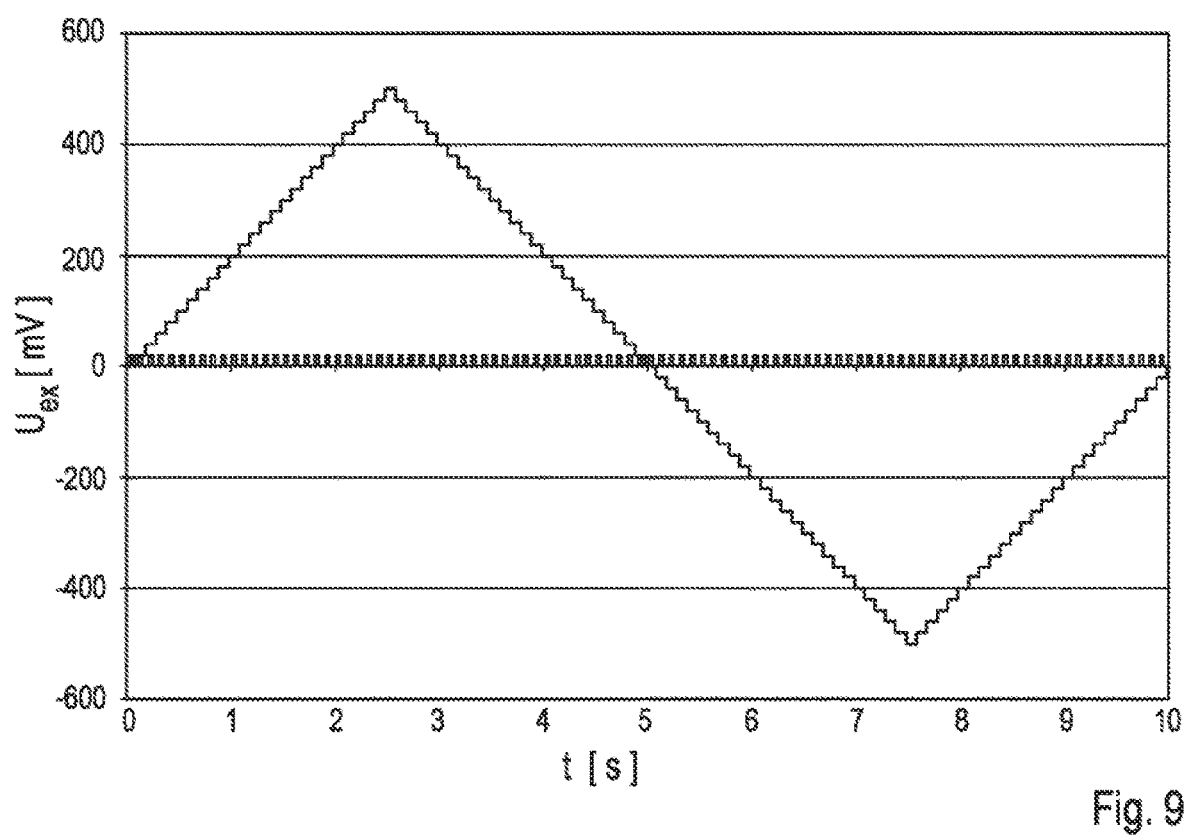
FIGS. 9 and 10 show an example of an excitation voltage signal using a combination of a cyclic voltammetry superimposed with DC pulses and additionally superimposed with a poly frequent AC voltage.
Figure 10:
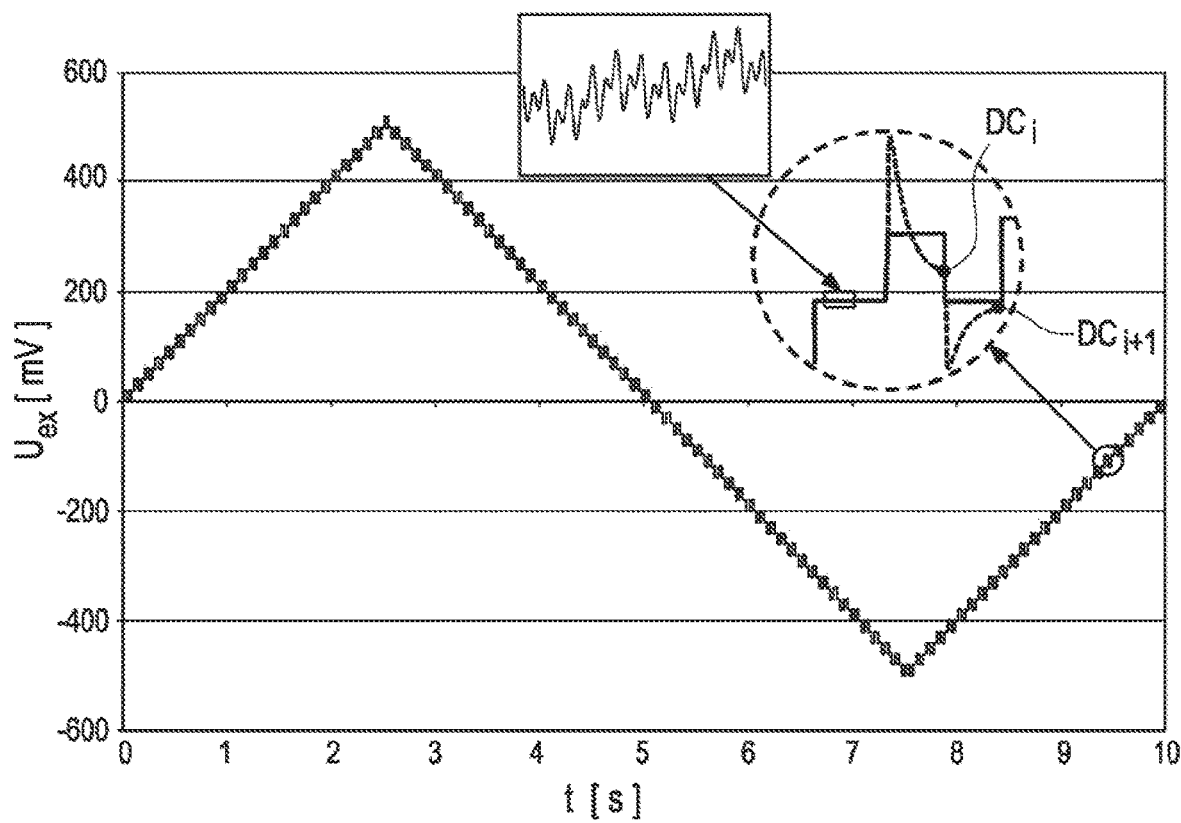

FIGS. 9 and 10 show an example of an excitation voltage signal $U_{ex}$ in mV versus time using a combination of a cyclic voltammetry superimposed with DC pulses and additionally superimposed with a poly frequent AC voltage. FIG. 9 shows the DC profile using cyclic voltammetry. The DC voltage has a rectangular wave form. A base voltage or start value at 0 mV is shown. The DC voltage profile may comprise increasing, e.g., in steps, the DC voltage from a start value to a first turning point, subsequent decreasing from the first turning point to a second turning point and subsequent increasing from the second turning point to the start value. FIG. 10 shows the excitation voltage signal comprising DC voltage profile and poly frequent AC voltage. A region (circle) of the excitation voltage signal is enlarged, in order to visualize the composition of the excitation voltage signal. In the big box the poly frequent AC voltage is shown. In the big circle with dashed lines, the excitation voltage signal is depicted as a solid line. Superimposed, for reference, the corresponding response, i.e., current response, is shown as a dashed line. $DC_i$ values may be selected from the end of the high pulse and low pulse phase from each rectangular DC pulse, where the base voltage is increased in steps to a first turning point, going down to a second turning point and going back to the start voltage. A voltage change range and direction may be adjusted to the used redox mediators and relevant redox active interfering substances, which can occur in a test sample. Usually for test strip based systems, during test time the measurement zone, also denoted as reaction zone, is not in a steady state situation due to dissolved reagent layer, sample temperature gradients and/or dosing effects. These effects can be compensated by using the information from the poly frequent AC response in combination with the related DC response. From each rectangular DC pulse, superimposed with the poly frequent AC excitation, two $DC_i$ values and the related admittance and phase values from the superimposed frequencies may be selected.

For the example shown in FIGS. 9 and 10, the above described predetermined relationship may be used to determine the analytical result, i.e., the analyte concentration. Weighting coefficients may be determined using a moving mesh method. Alternatively, neuronal net or multivariate regression methods or combinations of these methods may be used. Other mathematical methods (e.g., the lasso method) may be used to identify and select the relevant observables and to reduce their total number in order to reduce the complexity of the determination and improve portability of the found predetermined relationship from the used training data on independently collected verification data sets.

Figure 11:
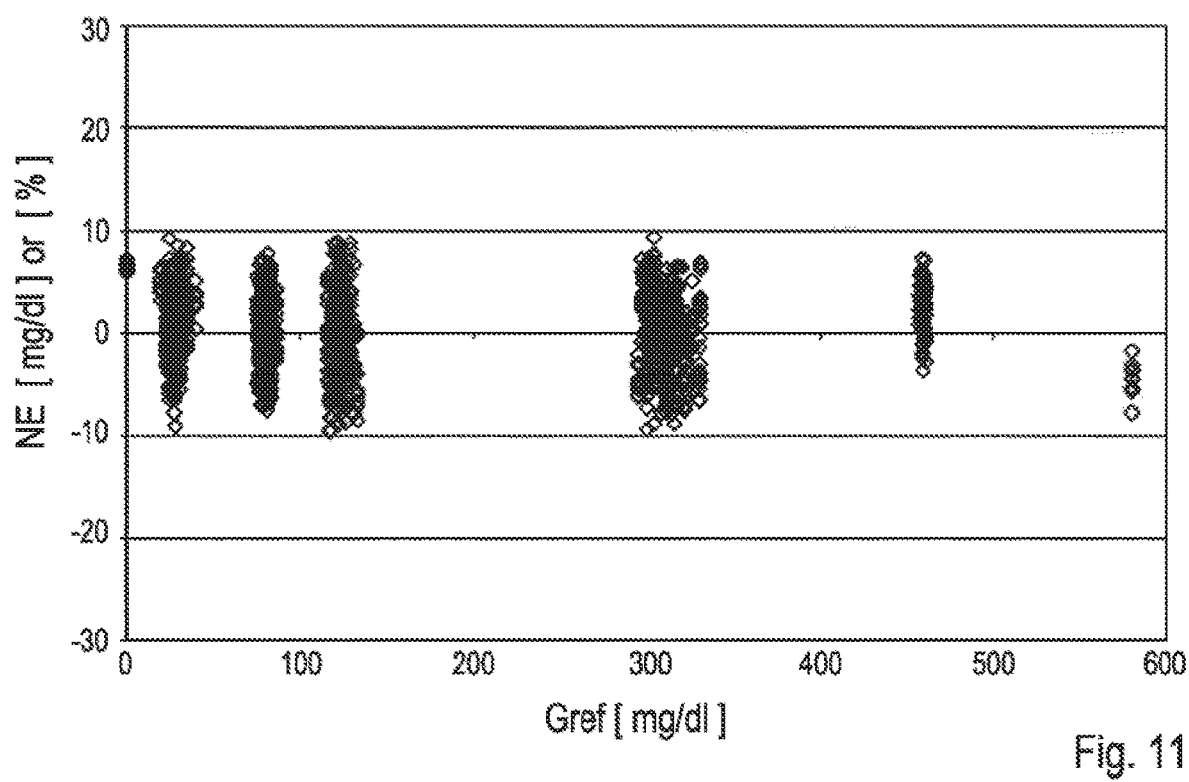
FIGS. 11 to 13 show experimental results for a glucose test strip for the excitation signal of FIGS. 9 and 10.
Figure 12:
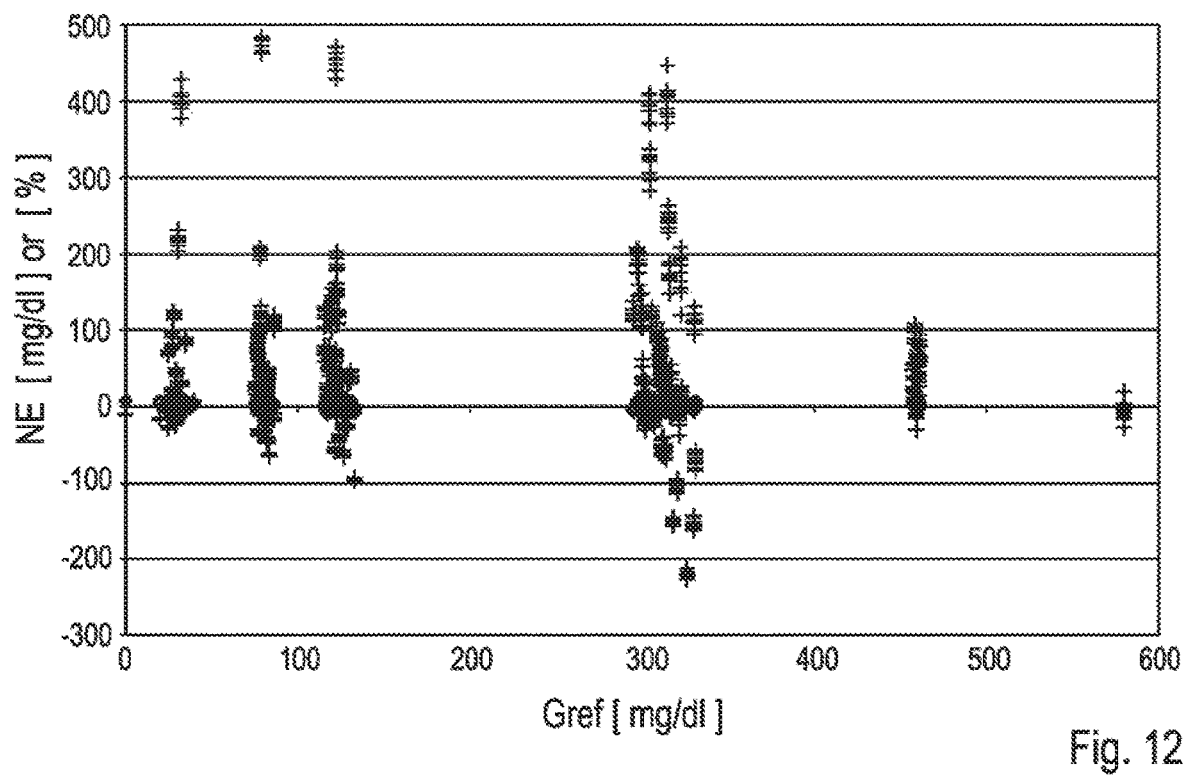
Figure 13:
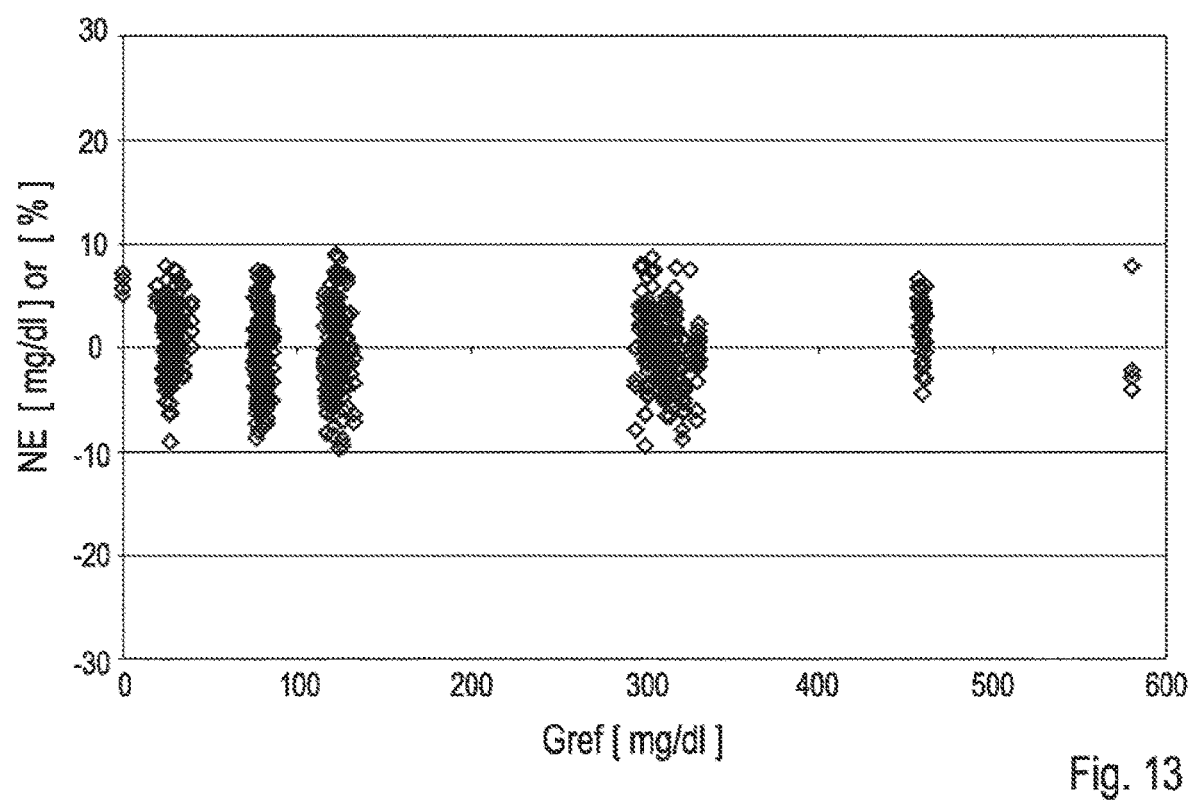

In FIGS. 11 to 13 experimental results for a glucose test strip for the excitation signal of FIGS. 9 and 10 is shown. The test elements may have a capillary to receive a test sample and structured gold electrodes on the bottom of the capillary, which are both covered with the same dried detection reagent. The electrodes may be identical and the detection reagent may support anodic and cathodic electrode reaction. Counter and working electrode may be defined by polarity generating the analytical reaction on one of the electrodes. FIG. 11 shows the normalized error NE of the determined analyte concentration, i.e., the glucose value, versus the reference method. All relevant test conditions and sample types are included in the training data set used to derive the coefficient for the given algorithm model. It is found that more than 99% of the NEs are within +/−8% (mg/dl) for the training data set. FIG. 12 shows the normalized errors for using poly frequent AC and DC profile information simultaneously (diamonds) compared to using a DC response of an amperometric measurement (crosses) for the determination of the analyte concentration. The determination using a DC response of an amperometric measurement only exhibits a larger scattering behavior compared to the determination using poly frequent AC and DC profile information simultaneously. For the shown data the manipulated blood samples with hematocrit levels from 0 to 70%, sodium levels from 110 to 190 mmol/l, potassium bromide concentrations up to 450 mg/ml and ascorbic acid and glutathione levels up to 100 mg/dl are used at ambient temperatures between 12 to 40° C. The test elements were tested immediately after being taken from protective packaging and with up to 96 hours' exposure time at tropical ambient conditions. The training data set includes all kind of combinations of the above described test conditions and sample types.

FIG. 13 shows the normalized error for a verification data set. The verification data set comprises measurement data, which was not used for weighting coefficient derivation. For FIG. 13, the predetermined relationship, in particular the mathematical model and weighting coefficients, determined with the training data set is used on the verification data set to determine the analyte concentration. Still more than 96% of the normalized errors are within +/−8% (mg/dl).

LIST OF REFERENCE NUMBERS 110 signal generation step
112 signal generator device
114 AC voltage signal
116 AC voltage signal
118 AC voltage signal
120 AC voltage signal
122 AC-voltage source
124 DC-voltage source
126 AC voltage
128 evaluation device
130 signal application step
132 measurement electrodes
134 measurement step
136 evaluation step
138 determination step
140 test element analysis system
142 analytical device
144 test element
146 measuring zone
148 sample opening
150 test element holder
152 electrical contacts
154 measurement unit
156 box

What is claimed is:
1. A method for determining a concentration of at least one analyte in bodily fluid, the method comprising the following steps:

at least one signal generation step, wherein at least one excitation voltage signal is generated by at least one signal generator device, wherein the excitation voltage signal comprises at least one poly frequent alternating current (AC) voltage and at least one direct current (DC) voltage profile, wherein the poly frequent AC voltage comprises at least two frequencies;

at least one signal application step, wherein the excitation voltage signal is applied to at least two measurement electrodes, which are in contact with the bodily fluid and which are adapted to determine the analyte electrically or electrochemically;

at least one measurement step, wherein a response is measured by using the measurement electrodes;

at least one evaluation step, wherein an AC current response for each frequency and a DC current response are evaluated from the response by at least one evaluation device, and wherein for each frequency at least one phase information and at least one impedance information is evaluated from the AC current response by the evaluation device;

at least one determination step, wherein the concentration of the analyte is determined from the DC current response and from one or both of the phase information and impedance information by using at least one predetermined relationship, wherein the AC voltage and DC profile are superimposed to form the excitation voltage signal, and determining a predetermined relationship between the concentration of the analyte and the DC current response, the phase information and impedance information.

2. The method according to claim 1, wherein the predetermined relationship is $$bG = \sum_{i=1}^{n} a_i DC_i e^{\sum_{m=1}^{f} b m_i Y m_i + c m_i P m_i},$$

wherein bG is the determined analyte concentration, i denotes the number of measurement time points, wherein i, n, f and m are natural integer numbers, m denotes the number of frequencies, $a_i$, $b_i$, $c_i$ are weighting coefficients, $Ym_j$ are admittance values from AC response at different frequencies at time points, $Pm_j$ are phase angle values from AC response at different frequencies at time points and $DC_i$ are DC response values at selected DC response time points.

3. The method according to claim 1, wherein the predetermined relationship is $$bG = \sum_{i=1}^{n} \sum_{m=1}^{f} \left( \frac{a_{mi} DC_i}{Y_{(imag)mi}} + \frac{b_{mi} DC_i}{Y_{(real)mi}} \right),$$

wherein bG is the determined analyte concentration, i denotes the number of measurement time points, wherein i, n, f and m are natural integer numbers, m denotes the number of frequencies, $a_i$ are weighting coefficients, $Y_{(imag)mi}$ and $Y_{(real)mi}$ are real and imaginary parts of admittance values from AC response at different frequencies at time points and $DC_i$ are DC response values at selected DC response time points.

4. The method according to claim 3, wherein the predetermined relationship is, $$bG = \sum_{\substack{i,j=1 \\ i \ne j}}^{n} \left( \frac{a_i DC_i}{Y_i} + b_i \left( \frac{DC_i}{Y_i} \cdot \frac{DC_j}{Y_j} \right) \right),$$

wherein bG is the determined concentration of the analyte, i and j denote the number of measurement time points, wherein i, j and n are natural integer numbers, $a_i$, $b_i$ and $c_i$ are weighting coefficients, $Y_i$, and $Y_j$ are either real or imaginary parts of admittance values from AC response at different frequencies at time points i and j, $DC_i$, $DC_j$ are DC response values at selected DC response time points.

5. The method according to claim 3, wherein the predetermined relationship is $$bG = \sum_{\substack{i,j=1 \\ i \ne j}}^{n} \sum_{\substack{m,l=1 \\ m \ne l}}^{f} \left( \frac{a_{mi} DC_i}{Y_{(imag)mi}} + \frac{b_{mi} DC_i}{Y_{(real)mi}} + c_{mi} \left( \frac{DC_i}{Y_{(imag)mj}} \cdot \frac{DC_j}{Y_{(real)li}} \right) \right),$$

wherein bG is the determined concentration of the analyte, i and j denote the number of measurement time points, wherein i, j, n, f, m and l are natural integer numbers, m and l denote the number of frequencies, $a_i$, $b_i$ and $c_i$ are weighting coefficients, $Y_{(imag)mi}$, $Y_{(real)mi}$ $Y_{(imag)mj}$ and $Y_{(real)mj}$ are real and imaginary parts of admittance values from AC response at different frequencies at time points i and j, and $DC_i$, $DCj$ are DC response values at selected DC response time points.

6. The method according to claim 1, wherein in the determination step the concentration of the analyte is determined in consideration of interference effects and production tolerances.

7. The method according to claim 1, wherein the AC voltage has a magnitude less than 30 mV rms.

8. The method according to claim 1, wherein the method further comprises at least one selection step, wherein in the selection step from the measurement time points at least one DC time point is selected, wherein the DC time point is a time point at which the DC response current is used in the determination step.

9. The method according to claim 1, wherein the DC voltage profile comprises a time profile, wherein DC voltage profile is selected from the group consisting of: a voltammetric voltage profile; an amperometric voltage profile.

10. The method according to claim 1, wherein in the evaluation step the AC current response and the DC current response are separated using at least one two-way analog electronic filter, which splits the signals between about 100 Hz and 500 Hz, wherein below 100 Hz the response is analyzed as DC and above 500 Hz it is analyzed as AC.

11. The method according to claim 1, wherein the predetermined relationship is one or more of selected, determined and verified by mathematical methods selected from the group consisting of multivariate analysis, multilinear principal component analysis, neuronal nets, moving mesh, lasso method, boosted random forest and bootstrapping, on at least one training data set.

12. The method according to claim 1, wherein the method comprises at least one fail safe step, wherein the fail safe step comprises determining if the analyte concentration is valid within predetermined limits.

13. The method according to claim 1, wherein the method comprises a sample application step, wherein a sample of bodily fluid is brought in contact with the measurement electrodes.

* * * * *

UNITED STATES PATENT AND TRADEMARK OFFICE
CERTIFICATE OF CORRECTION

PATENT NO. : 11,125,712 B2
APPLICATION NO. : 16/441282
DATED : September 21, 2021
INVENTOR(S) : Michael Marquant, Samuel Evgin and Melanie Klein It is certified that error appears in the above-identified patent and that said Letters Patent is hereby corrected as shown below:

In the Specification

Column 14, Line 63, Column 24, Line 35, Column 32, Line 31, and Column 37, Claim 2, Line 40 the mathematical formula should appear as follows:

$$bG = \sum_{i=1}^{n} a_i\, DC_i\, e^{\sum_{m=1}^{f} bm_i Ym_i + cm_i Pm_i}$$

Column 15, Line 22, Column 24, Line 52, Column 32, Line 56, and Column 37, Claim 3, Line 57 the mathematical formula should appear as follows:

$$bG = \sum_{i=1}^{n} \sum_{m=1}^{f} \left( \frac{a_{mi}\, DC_i}{Y_{(imag)mi}} + \frac{b_{mi}\, DC_i}{Y_{(real)mi}} \right)$$

Signed and Sealed this
Nineteenth Day of March, 2024

Katherine Kelly Vidal
*Director of the United States Patent and Trademark Office*

Column 15, Line 44, Column 25, Line 1, Column 33, Line 1, and Column 38, Claim 4, Line 6 the mathematical formula should appear as follows:

$$bG = \sum_{\substack{i,j=1 \\ i \neq j}}^{n} \left( \frac{a_i \, DC_i}{Y_i} + b_i \left( \frac{DC_i}{Y_i} \cdot \frac{DC_j}{Y_j} \right) \right)$$

Column 15, Lines 59-62 the mathematical formula should appear as follows:

$$bG = \sum_{\substack{i,j=1 \\ i \neq j}}^{n} \sum_{\substack{m,l=1 \\ m \neq l}}^{f} \left( \frac{a_{mi} \, DC_i}{Y_{(imag)mi}} + \frac{b_{mi} \, DC_i}{Y_{(real)mi}} + c_i \left( \frac{DC_i}{Y_{(imag)mj}} \cdot \frac{DC_j}{Y_{(real)li}} \right) + d_i \left( \frac{DC_i}{Y_{(imag)lj}} \cdot \frac{DC_j}{Y_{(real)mi}} \right) \right)$$

Column 25, Line 23, Column 33, Line 19, and Column 38, Claim 5, Line 23 the mathematical formula should appear as follows:

$$bG = \sum_{\substack{i,j=1 \\ i \neq j}}^{n} \sum_{\substack{m,l=1 \\ m \neq l}}^{f} \left( \frac{a_{mi} DC_i}{Y_{(imag)mi}} + \frac{b_{mi} DC_i}{Y_{(real)mi}} + c_{mi} \left( \frac{DC_i}{Y_{(imag)mj}} \cdot \frac{DC_j}{Y_{(real)li}} \right) \right)$$

Column 34, Line 54 the mathematical formula should appear as follows:

$$objective\ function = Average \left[ \sum_{i=1}^{n} NE_i \right]^2$$